United States Patent [19]

Ito

[11] Patent Number: 4,989,079
[45] Date of Patent: Jan. 29, 1991

[54] COLOR CORRECTION DEVICE AND METHOD HAVING A HUE AREA JUDGEMENT UNIT

[75] Inventor: Takanori Ito, Yokohama, Japan

[73] Assignee: Ricoh Company, Ltd., Tokyo, Japan

[21] Appl. No.: 260,277

[22] Filed: Oct. 20, 1988

[30] Foreign Application Priority Data

Oct. 23, 1987 [JP] Japan ............... 62-267942
Jun. 2, 1988 [JP] Japan ............... 63-135833

[51] Int. Cl.$^5$ .................... H04N 1/46; G03F 3/08
[52] U.S. Cl. ........................ 358/80; 358/75; 358/79
[58] Field of Search ............ 358/75, 79, 80, 22, 358/28

[56] References Cited

U.S. PATENT DOCUMENTS

| | | | |
|---|---|---|---|
| 4,335,398 | 6/1982 | Yamada | 358/80 |
| 4,535,413 | 8/1985 | Shiota et al. | 358/80 |
| 4,602,277 | 7/1986 | Guichard | 358/27 |
| 4,642,682 | 2/1987 | Orsburn et al. | 358/80 |
| 4,656,505 | 4/1987 | Yamada et al. | 358/75 |
| 4,661,843 | 4/1987 | Sekizama et al. | 358/80 |
| 4,675,704 | 6/1987 | Yamamoto | 358/80 |
| 4,679,066 | 7/1987 | Masunaga et al. | 358/28 |
| 4,679,072 | 7/1987 | Takayama | 358/296 |
| 4,679,074 | 7/1987 | Sugiura et al. | 358/80 |
| 4,745,466 | 5/1988 | Yoshida et al. | 358/80 |
| 4,893,779 | 7/1990 | Ito | 358/79 |

FOREIGN PATENT DOCUMENTS

| | | |
|---|---|---|
| 59-161981 | 9/1984 | Japan . |
| 62-47273 | 2/1987 | Japan . |
| 2208460 | 3/1989 | Japan . |
| 1-228268 | 9/1989 | Japan . |
| 1-255380 | 10/1989 | Japan . |
| 1-272266 | 10/1989 | Japan . |
| 1-277062 | 11/1989 | Japan . |
| 2145598 | 3/1985 | United Kingdom . |

Primary Examiner—James J. Groody
Assistant Examiner—Kim Yen Vu
Attorney, Agent, or Firm—Oblon, Spivak, McClelland, Maier & Neustadt

[57] ABSTRACT

A color correction device used for a color electrophotographic machine or color printing machine. The device includes a hue area judgement unit for judging to which hue area among at least three predetermined hue areas the hue represented by input color image signals belongs. With respect to the judged hue area according to this judgement, color correction parameters are set, and in accordance with the set color correction parameters, the input image signals are converted to output color image signals used for printing.

47 Claims, 14 Drawing Sheets

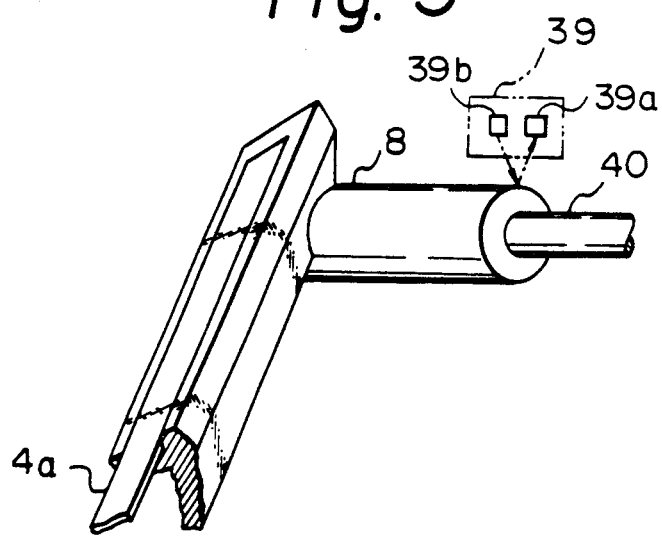
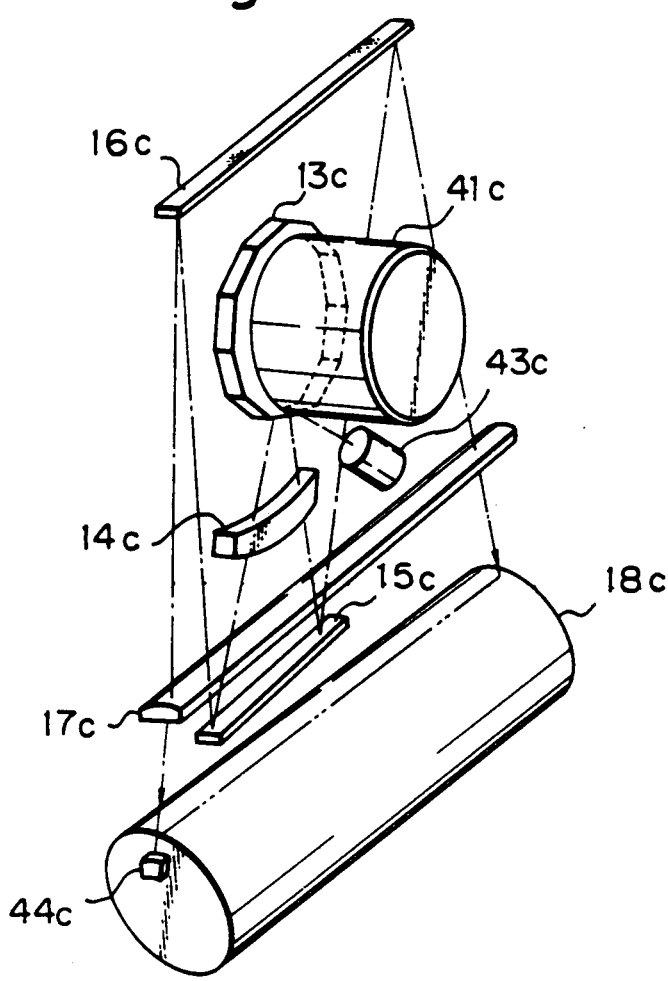

Fig. 16a

[PRESENT CONDITION]

COLOR MODE : 4C FULL COLOR

VARIABLE POWER RATE : LENGTH 100% WIDTH 100%

COLOR TONE ADJUSTMENT : OFF

[COLOR MODE] [VARIABLE POWER RATE] [COLOR TONE ADJUSTMENT]

Fig. 16b

[SPECIFIC COLOR DESIGNATION MODE]

[RESET] [ADJUSTMENT END]

[ R ] COLOR TONE ADJESTMENT

[DARK] ├─┼─┼─✲─┼─┤ [LIGHT]

[BRILLIANT]

[YELLOW] ─────────── [RED PURPLE]

[GRAYISH]    [END]

COLOR CORRECTION DEVICE AND METHOD HAVING A HUE AREA JUDGEMENT UNIT

BACKGROUND OF THE INVENTION

1. Field of the Invention

The present invention relates to a color correction device and method which adjust the color components of an image signal containing color information and a color electrophotographic machine which employs such a color correction device.

2. Description of the related art

In color electrophotographic machines, there are presently available digital color copying machines. The digital color copying machines optically read an image in an original to obtain separate electrical image information signals on three primary-color images of R (red), G (green) and B (blue). These information signals are converted to different electrical information signals of C (cyan), M (magenta) and Y (yellow). The respective basic color images are printed by C, M and Y toners on the basis of the different electrical image information signals of C, M and Y, and the original image is reproduced by laying these printed colors one on top of another.

Theoretically, the original image and print image are the same in color. However, actually, if the R, G and B signals obtained from the original are solely converted to C, M and Y signals and are printed in three color toners, a large difference will be produced between the original color and the printed color because (a) the spectral characteristic of color separation filters used in the image read unit are actually not ideal, (b) the color of each of the toners used for printing is also not ideal, and (c) the color obtained by the principle of subtractive color mixture for laying a plurality of print colors sequentially one on top of another is different from the actual printed color. In order to avoid such discrepancy, when the R, G and B signals are converted to the C, M and Y signals, a masking process is performed to correct the colors. Furthermore, in order to reproduce a correct achromatic color, often achromatic color components (black and gray) are extracted from the R, G and B signals and are printed by a separate black toner. However, an "additivity rule of densities" does not actually hold due to the influence of surface reflection, etc. As a result, correct color correction cannot be performed.

The masking techniques are known, for example, in (1) Japanese Laid-Open Publication No. 59-161981 (British Patent No. 2145598) and (2) Japanese Laid-Open Publication No. 62-47273. In the techniques of the reference (1), nine coefficients used in the masking process are separately adjustable in a plurality of stages. By changing those coefficients, the contents of the color correction by the masking process are changed and as a result the colors to be printed are adjustable. In this technique, however, since the respective masking coefficients do not correspond to the basic colors of Y, M and C in one-to-one relationship, it is not clear which coefficients should be adjusted in what manner in order to obtain a desired particular color. Therefore, adjustment is required to be repeated many times by trial and error. If the color tone of a particular color is preferentially changed, a balance among Y, M and C colors may be undesirably lost and achromatic color portions such as black and gray portions of the image may often be colored.

The techniques of the (2) reference are intended to correct the colors by referring to the contents of a memory table and changing a part or the whole of the memory table to adjust the colors. However, in the particular reference, it is necessary to prepare a memory having a large capacity corresponding to the degree of freedom of color adjustment. In that case, therefore, if the degree of freedom of color adjustment is heightened, the device would undesirably become expensive.

In these types of devices, the user must adjust colors as needed in addition to the basic color correction because of the aging of the color characteristic of the device itself, variations in the characteristic of the individual devices, the user's own taste in colors, and intentional requirement for color change, etc.

SUMMARY OF THE INVENTION

It is an object of the present invention to provide a color correction device and method which are capable of easily adjusting colors.

It is another object of the present invention to provide an inexpensive device which is capable of performing high-accuracy color correction.

In order to achieve the above objects, the present invention provides a color correction device which corrects input image signals of basic colors, representative of color-separated input images, to produce output image signals of another basic colors, representative of output images for printing. The device comprises an input unit for receiving information of colors related to the input images and to the output images, a parameter setting unit for setting color correction parameters on the basis of the received information by the input unit, and a color conversion unit for converting the input image signals to the output image signals in accordance with the set color correction parameters.

According to this device, the operator is only required to designate information on colors to be corrected and colors after correction by that color correcting operation, so that the colors of the image before and after correction are easily understood, and color correction becomes easier.

The present invention also provides a color correction device which corrects input image signals of basic colors, representative of color-separated input images, to produce output image signals of other basic colors, representative of output images for printing. The device comprises a hue area judgement unit for judging to which hue area among at least three predetermined hue areas the hue represented by the input image signals belongs, a parameter setting unit for setting color correction parameters with respect to the hue area judged by the hue area judgement unit, and a color conversion unit for converting the input image signals to the output image signals in accordance with the, set color correction parameters.

When color conversion is performed in accordance with a normal masking equation, color correction is performed for various hues even if part of the masking coefficients may be changed. Therefore, it is very difficult to limit a hue to be actually adjusted to only a color to be changed. In the color correction device according to the present invention, a hue is divided into a plurality of hue areas in each of which color is then corrected using the corresponding separate color correction parameters. A change of color correction parameters in the masking circuit causes the color characteristic, for example a hue, to change. According to the above arrangement, the color correction parameters are independent for each hue area, so that color correction is not performed on image portions having a hue greatly remote from a hue whose color is to be adjusted. Thus the color adjustment that the operator does not intend to perform is not carried out. If for example, a hue is to be divided into six areas R-Y, Y-G, G-C, C-B, B-M and M-R with six hues of R, G, B, C, M and Y as the boundaries, separate masking coefficients are set in the six corresponding hue areas, so that when, for example, the hue of the R color is to be adjusted, the masking coefficients in the R-Y and M-R areas related to the R color are changed and the masking coefficients in the other remaining hue areas are not changed. Therefore, color adjustment is not performed for the hues excluding that to be adjusted.

Generally, the influence of the respective C, M and Y toners on the spectral density of a printed color changes depending on how the C, M and Y toners overlap, i.e., the printed color, especially, its hue. Therefore, the "additivity rule of densities" does not hold, so that it is impossible to make coincide a theoretical color corresponding to the ratio of amounts of the respective toners used in printing and the corresponding actual printed color.

However, according to the above structure, different color correction parameters can be set in the corresponding hue areas, so that optimal masking coefficients corresponding to how C, M and Y overlap may be set in the corresponding hue areas of a printed color. Thus by color correction using the masking coefficients, the influence of the fact that the "additivity rule of densities"does not hold is reduced to thereby provide color correction with high accuracy.

Preferably, the parameter setting unit comprises a parameter hold circuit for holding color correction parameters, the number of which is equal to or greater than the number of the predetermined hue areas, and a selection circuit for selecting a part of the color correction parameters held in the parameter hold circuit in accordance with the hue area judged by the hue area judgement unit.

It is preferred that the parameter setting unit corrects at least one part of the spectral density value related to printing color for a particular color corresponding to the boundary between the hue areas and of the amount of toners used for printing the particular color, on the basis of a predetermined stoichiometric value and the received information by the input unit. The parameter setting unit calculates the color correction parameters on the basis of the corrected spectral density value and/or amount of toners.

It is also preferred that the color correction device further comprises an extraction circuit for extracting an achromatic color component contained in the input image signals on the basis of achromatic color extraction parameters which are changed in accordance with the hue area judged by the hue area judgement unit.

It is desired that the hue area judgement unit comprises a hue signal production circuit for producing a hue signal from the input image signals, a hue hold circuit for holding predetermined signals of hue information, and a comparison circuit for comparing the hue signal from the hue signal production circuit and the predetermined signals from the hue hold circuit.

The present invention also provides a color correction device which corrects input image signals of basic colors, representative of color-separated input images, to produce output image signals of other basic colors including an achromatic color, representative of output images for printing. The device comprises a hue area judgement unit for judging to which hue area among at least three predetermined hue areas the hue represented by the input image signals belongs; a first parameter setting unit for setting achromatic color extraction parameters with respect to the hue area judged by the hue area judgement unit; an extraction circuit for extracting an achromatic color component contained in the input image signals in accordance with the set achromatic color extraction parameters to produce an achromatic component signal representative of the extracted component; an achromatic color correction unit for correcting the input image signals in accordance with the achromatic component signal from the extraction circuit; and a color conversion unit for converting the corrected input image signals from the achromatic color correction unit, to the output image signals in accordance with color correction parameters.

The hue is divided into a plurality of areas and an achromatic color component is extracted on the basis of separate extraction parameters for each hue area.

The influence of C, M, Y and BK on the spectral density of a printed color varies depending on how C, M, Y and BK overlap, namely, the printed color. According to the above structure, different extraction parameters can be set in the corresponding areas divided by hues, so that optimal extraction parameters corresponding to the state in which the toners overlap can be set for the corresponding printed color. Thus errors involved in achromatic color component extraction are reduced.

Preferably, the color correction device further comprises a second parameter setting unit for setting the color correction parameters in the color conversion unit on the basis of the hue area judged by the hue area judgement unit.

It is desired that the second parameter setting unit comprises a parameter hold circuit for holding color correction parameters the number of which is equal to or greater than the number of the predetermined hue areas, and a selection circuit for selecting a part of the color correction parameters held in the parameter hold circuit in accordance with the hue area judged by the hue area judgement unit.

It is also desired that the first parameter setting unit comprises a parameter hold circuit for holding achromatic color extraction parameters the number of which is equal to or greater than the number of the predetermined hue areas, and a selection circuit for selecting a part of the achromatic color extraction parameters held in the parameter hold circuit in accordance with the hue area judged by the hue area judgement unit.

Preferably, the hue area judgement unit comprises a hue signal production circuit for producing a hue signal from the input image signals, a hue hold circuit for holding predetermined signals of hue information, and a comparison circuit for comparing the hue signal from the hue signal production circuit and the predetermined signals from the hue hold circuit.

The present invention further provides a color electrophotographic machine which comprises a reading process unit for optoelectrically converting light signals separated into basic colors, representative of color-separated images of an original document, to electrical input image signals, respectively, a hue area judgement unit for judging to which hue area among at least three predetermined hue areas the hue represented by the input image signals belongs, a parameter setting unit for setting color correction parameters with respect to the hue area judged by the hue area judgement unit, a color conversion unit for converting the input image signals to output image signals in accordance with the set color correction parameters, and an image printing unit for printing a color image of the original in accordance with the converted output image signals.

Other objects and features of the present invention will now be apparent from the following description on embodiments of the present invention in conjunction with the drawings.

BRIEF DESCRIPTION OF THE DRAWINGS

FIG. 3 is a perspective view, on enlarged scale, of a part of a first carriage shown in FIG. 1, FIG. 4 is a perspective exploded view of a BK printing unit shown in FIG. 1.

DETAILED DESCRIPTION OF THE PREFERRED EMBODIMENTS

Figure 1:
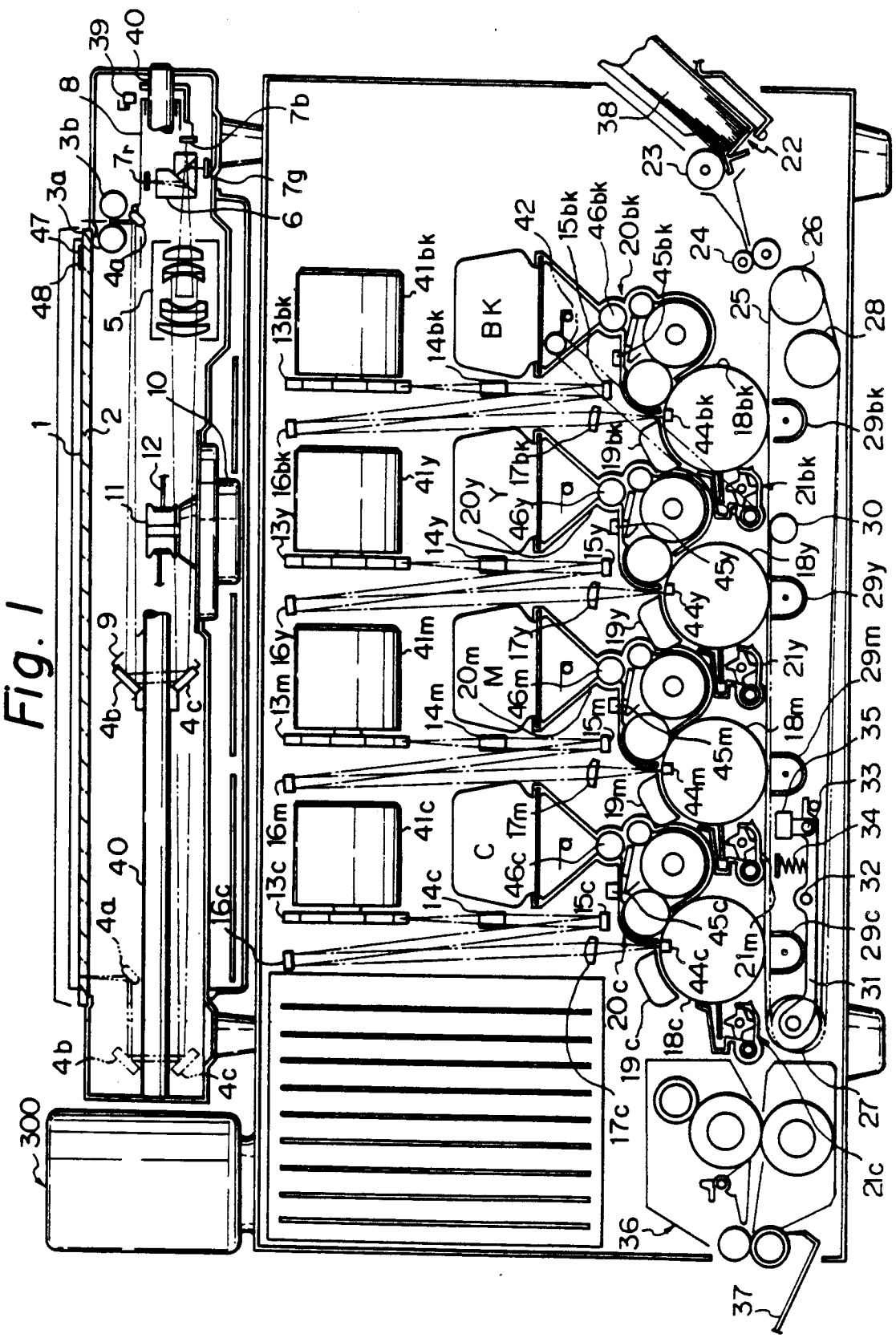
FIG. 1 is a front view of a mechanical section of a digital color copying machine as one embodiment of the present invention, FIG. 2, constituted by FIG. 2a and FIG. 2b, is a schematic block diagram of a control unit of the copying machine of FIG. 1.
Figure 2A:
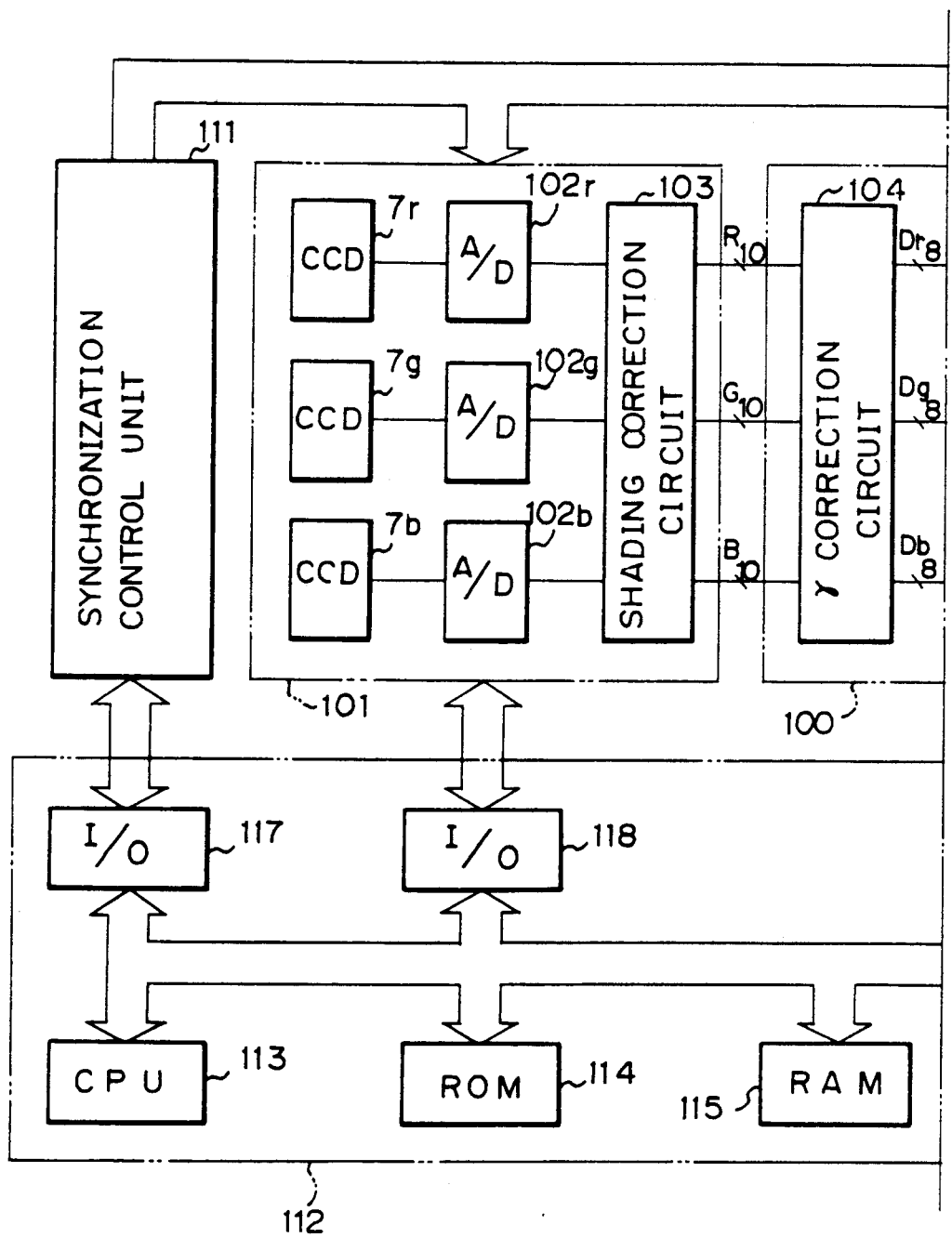
Figure 2B:
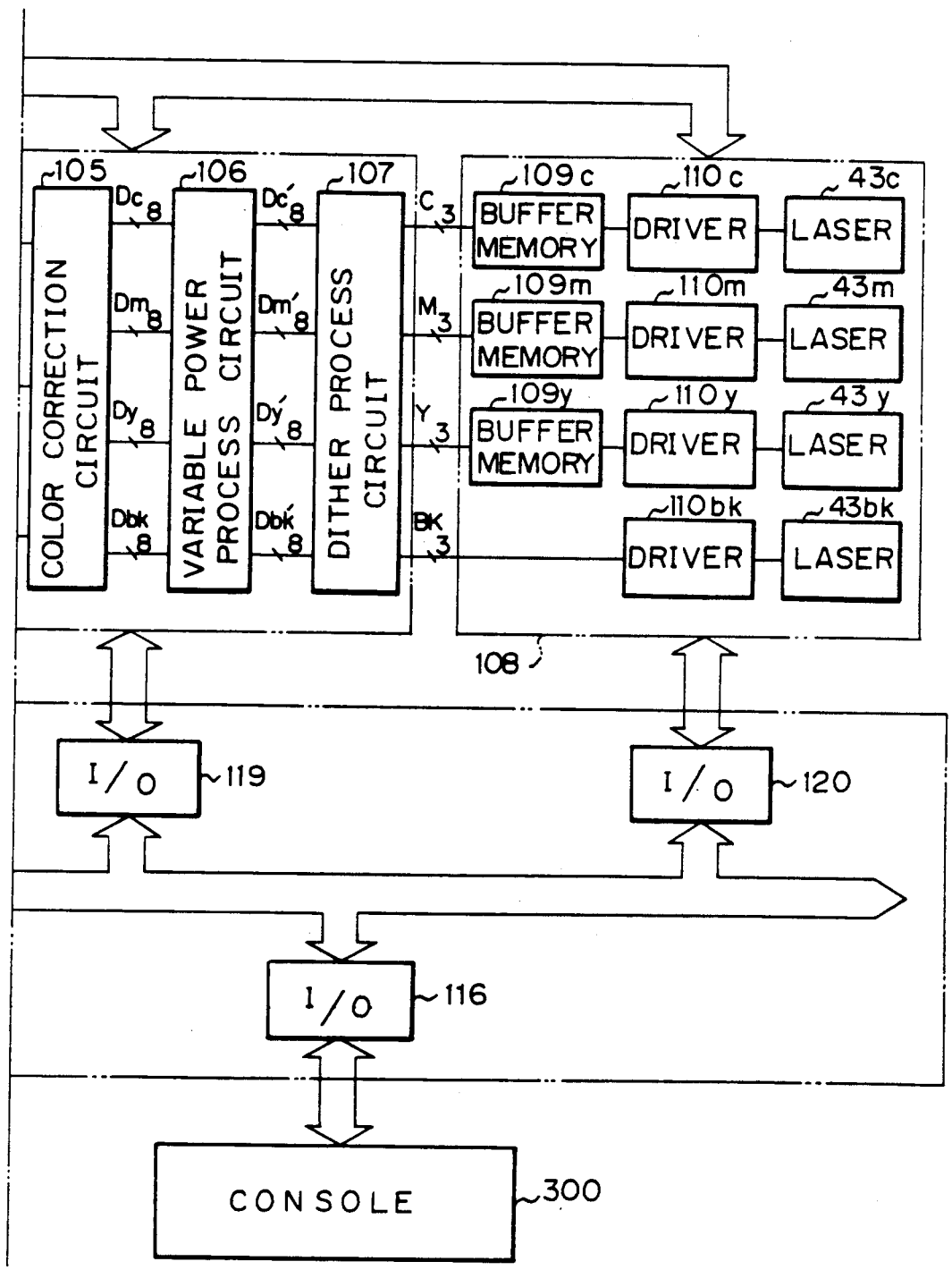

FIG. 1 schematically shows the structure of a mechanical section of a digital copying machine as one embodiment of the present invention, and FIG. 2 schematically shows the electronic circuit of the control unit of the copy machine of FIG. 1.

Referring first to FIG. 1, an original document 1 is placed on a platen (a contact glass plate) 2 and illuminated by original illuminating fluorescent lamps 3a and 3b. The reflected light from the original document 1 is reflected by movable first, second and third mirrors 4a, 4b and 4c, which enters via a focusing lens 5 into a dichroic prism 6 where the light is separated into red (R), green (G) and blue (B) light segments which are then input to solid-state image sensors comprising CCDs (Charge Coupled Devices) 7r, 7g and 7b, respectively.

The fluorescent lamps 3a and 3b and the first mirror 4a are mounted on a first carriage 8. The second and third mirrors 4b and 4c are mounted on a second carriage 9 which moves at half the speed of the first carriage 8. Thus, the length of the optical paths from the original 1 to the CCDs 7r, 7g and 7b is maintained constant. When an original image is read, the first and second carriages 8 and 9 are scanned from right to left. A carriage drive motor 10 has a shaft carrying thereon a carriage drive pulley 11 around which a carriage drive wire 12 is wound to which wire the first carriage 8 is coupled. The wire 12 is further wound around a movable pulley (not shown) on the second carriage 9. Therefore, when the motor 10 is rotated forwardly and backwardly, the first and second carriages 8 and 9 move forwardly or scan to read the original image and return, respectively.

When the first carriage 8 is at a position shown in FIG. 1 namely at its home position, a home position sensor 39 comprising a reflective photosensor 39a and a light source 39b senses this state. FIG. 3 shows the structure of the sensor in detail. When the first carriage 8 is moved rightward out of its home position to perform optical scan, the sensor 39 is irradiated with light from the light source 39b. When the first carriage 8 returns to its home position, the sensor 39 is now irradiated with the reflected light from the light source 39b. When the sensor 39a changes from its light interruption state to its light reception state, the carriage 8 is controlled to stop.

As shown in FIG. 2, the output signals from the CCDs 7r, 7g and 7b in a reading process unit 101 are subjected to analog/digital conversion and then delivered to an image process unit 100 where the signals are subjected to required processing and converted to binary signals representing print color information segments on black (BK), yellow (Y), magenta (M) and cyan (C). The binary signals are input to corresponding laser drivers 110bk, 110y, 110m and 110c which drive corresponding semiconductor lasers 43bk, 43y, 43m and 43c. Thus, the respective lasers output laser beams modulated by the binary print color signals.

In FIG. 1, the laser beams output from the semiconductor lasers 43bk, 43y, 43m and 43c (not shown in FIG. 1) are reflected by rotary multimirrors 13bk, 13y, 13m and 13c, fed via f-θ lenses 14bk, 14y, 14m and 14c which correct a curve at each of the ends of the scanned surface, reflected sequentially by routh mirrors 15bk, 15y, 15m and 15c and fifth mirrors 16bk, 16 y, 16m and 16c, passed through cylindrical lenses 17bk, 17y, 17m and 17c for multimirror tilt correction, and irradiated onto photosensitive drums 18bk, 18y, 18 m and 18c for focusing purposes.

The rotary multimirrors 13bk, 13y, 13m and 13c are fixed to the corresponding rotational shafts of multimirror drive motors 41bk, 41y, 41m and 41c which are rotated at a fixed speed to drive the multimirrors at a constant speed. By the rotation of the multimirrors, the laser beams are scanned in a direction perpendicular to the direction of rotation of the photosensitive drums (clockwise in FIG. 1), namely, along the rotational shafts of the drums.

FIG. 4 shows in detail a laser scanning system of a cyan color printing device as one example of the laser scanning systems. Reference numeral 43c denotes a semiconductor laser. As shown by the dot-dot-dashed line in FIG. 4, the laser beam is scanned along the rotational shaft of the photosensitive drums 18c. A sensor 44c comprising a photoelectric conversion device which detects laser beams is provided at one end of the drum 18c on the line of scanned laser beams. When the sensor 44c changes from a state where it has detected the laser beam to a state where it does not detect the beam, the scanning of one line starts. The output signal (pulse), representing the laser beam detection, from the sensor 44c is processed as a line synchronizing pulse for laser scanning. The magenta, yellow and black printing devices are quite the same in structure as the cyan printing device of FIG. 4.

In FIG. 1, the surfaces of the photosensitive drums are charged uniformly by scorotrons (chargers) 19bk, 19y, 19m and 19c connected to a negative high voltage generator (not shown). When the uniformly charged photosensitive drum surfaces are irradiated with a laser beam modulated by a printing signal, the electric charges on the irradiated portion of the drums flow to the system ground and thus disappear due to photoconductive phenomenon. In that case, the lasers are controlled such that they are not lighted for a portion corresponding to a high density portion of the original, but lighted for a portion corresponding to a lower density portion of the original. The surface portions of the drums 18bk, 18y, 18m and 18c corresponding to the high density portion are charged to a potential of −800 volts while the drum surface portions corresponding to the lower density portion are charged to −100 volts or so and thus an electrostatic latent image is formed corresponding to the light and shade of the original. The latent images are developed by black, yellow, magenta and cyan developing units 20bk, 20y, 20m and 20c, and thus black, yellow, magenta and cyan toner images are formed on the drums 18bk, 18y, 18m and 18c, respectively.

The toners within the respective developing units are positively charged by stirring and the developing units each are impressed with a developing bias of about −200 volts by a developing bias generator (not shown). Therefore, the toners adhere to the portions of the drum surfaces where the surface potentials are below the developing bias to thereby form toner images corresponding to the original image.

Printing sheet 38 accommodated in a transfer paper cassette 22 is fed out by a feed-out roller 23 and delivered by registration rollers 24 onto a transfer belt 25 with predetermined timing. The printing paper placed on the transfer belt 25 is passed sequentially below the drums 18bk, 18y, 18m and 18c by the movement of the transfer belt 25. During the sequential passage below these drums, black, yellow, magenta and cyan toner images are sequentially transferred onto the printing paper by the action of corotrons (transfer chargers) 29bk, 29y, 29m and 29c below the transfer belt 25. The printing paper with the transferred toner images thereon is then delivered to a thermal fixing unit 36 where the toners are fixed to the printing paper and the printing paper is then discharged to a tray 37.

The toners remaining on the drums after the transfer operation are removed by cleaner units 21bk, 21y, 21m and 21c.

The black toner collecting cleaner unit 21bk and black color developing unit 20bk are coupled through a toner collecting pipe 42 to return the black toner collected by the cleaner unit 21bk to the developing unit 20bk. However, since the yellow, magenta and cyan toners collected by other cleaner units 21y, 21m and 21c contain different color toners from the preceding stages, they are not reused. For example, in transfer, the black toner is reversely transferred from the printing paper onto the drum 18y and thus the cleaner unit 21y collects not only yellow toner but also black toner. Therefore, the collected yellow toner is never reused.

The developing units have corresponding toner density sensors 45bk, 45y, 45m and 45c which output signals indicative of the densities of the toners in the developing units to a toner density control unit (not shown). The toner density control unit outputs toner supplement signals in accordance with the outputs from the toner density sensors to supplement quantities of toners consumed for toner image formation in order to maintain the toner densities constant at the respective developing units. In response to these toner supplement signals, toner supplement motors (not shown) provided at the corresponding developing units are driven. Mounted to the respective rotational shafts of the toner supplement motors are toner supplement rollers 46bk, 46y, 46m and 46c which have grooves through which the corresponding toners are conveyed. In response to the toner supplement signals, the toner supplement rollers are moved to supplement the toners from upper toner containers to the corresponding developing units.

The transfer belt 25 which conveys the printing paper from the drum 18bk to 18c extends around an idle roller 26, a drive roller 27 and idle rollers 28 and 30 and is driven counterclockwise by the drive roller 27. The drive roller 27 is pivoted at the left-hand end of a lever 31 pivoted at a shaft 32. Pivoted at the right-hand end point 33 of the lever 31 is a plunger 35 of a black mode setting solenoid (not shown). A compression coil spring 34 is disposed between the plunger 35 and the shaft 32 and applies a clockwise torque to the lever 31.

When the black mode setting solenoid is not energized, i.e., is in a color operation mode, the transfer belt 25 for placing the printing paper thereon contacts with the drums 44bk, 44y, 44m and 44c, as shown by the solid lines in FIG. 1. Under such conditions, when printing paper is placed on the belt 25 and toner images are formed on all the drums, respective toner images are transferred to the printing paper, as the recording paper moves (the color operation mode). When the black mode setting solenoid is energized (black operation mode), the lever 31 is turned counterclockwise against the repulsive force of the spring 34. This causes the drive roller 27 to lower about 5 millimeters and the transfer belt 25 moves away from the drums 44y, 44m and 44c, but is kept in contact with the drum 44bk. Under such conditions, the printing paper on the transfer belt 25 contacts only with the drum 44bk, so that the black toner image alone is transferred to the printing paper. Since the printing paper does not contact with the drums 44y, 44m and 44c, the remaining toner adhering to those drums does not adhere to the printing paper, spots of yellow, magenta, cyan, etc., do not appear at all on the printing paper. Thus by the copying in the black operation mode, a copy similar to that obtained by a regular black monochromatic copying machine is provided.

Figure 5:
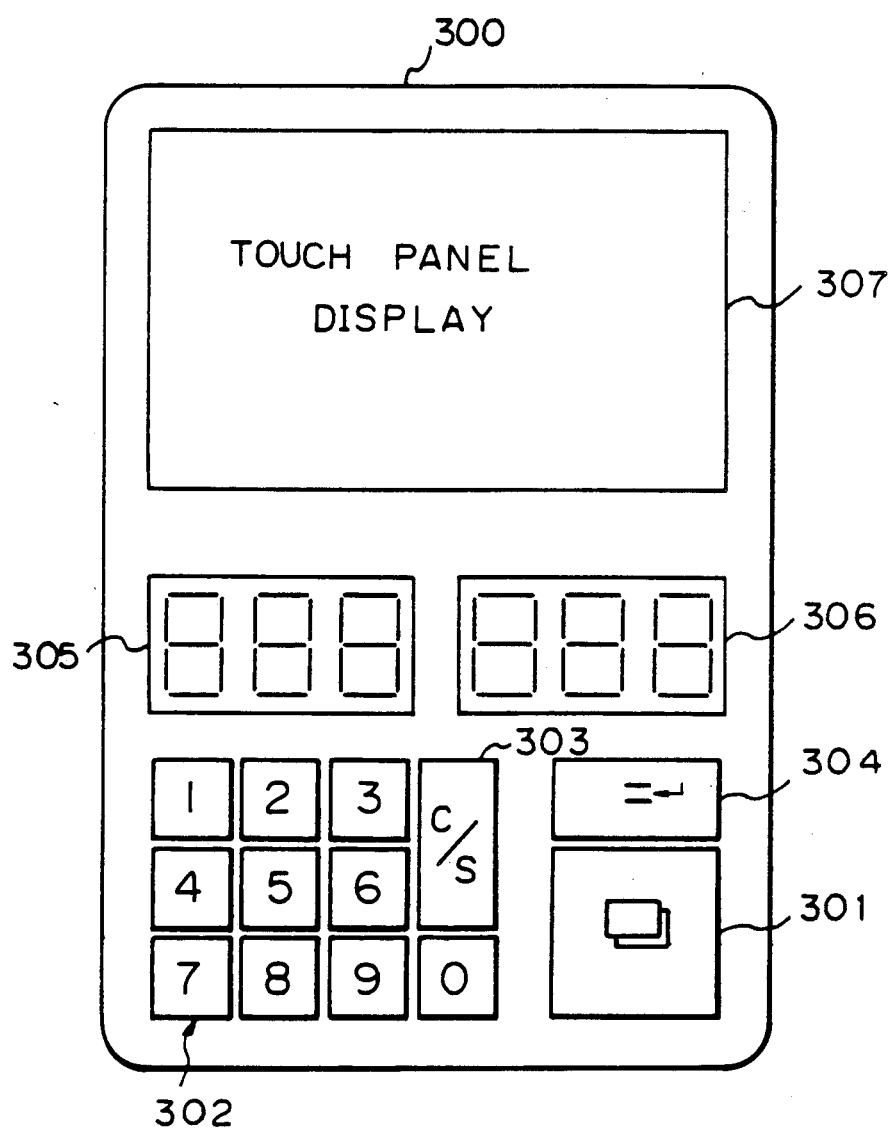
FIG. 5 is a front view, on enlarged scale, of a console board shown in FIG. 1.

FIG. 5 shows the appearance of a console board 300 of the FIG. 1 device. As shown in FIG. 5, the console board 300 includes a copy start key 301, ten-keys 302, a clear stop key 303, an interrupt key 304, a set-number display 305, a copy-number display 306 and a touch panel display 307. The touch panel display 307 includes a multiplicity of transparent contact switches arranged on the display face of a display wherein the display and input units are integrally formed. More specifically, the selection of the respective operation modes, the display of guidance on how to input data, and the display of a selected operation mode are performed by the touch panel display 307.

Figure 6:
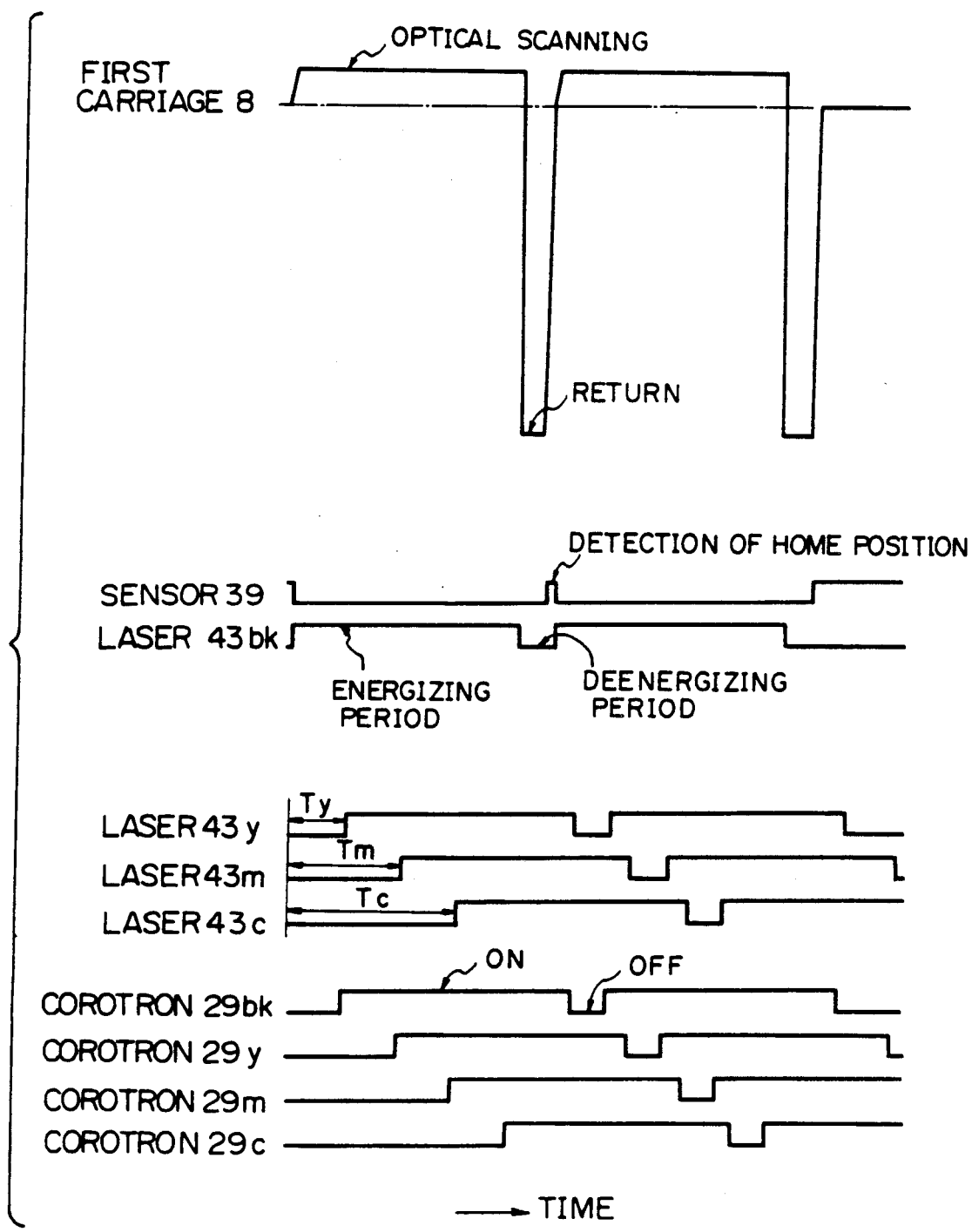
FIG. 6 is a chart showing the relationship in time among original document reading scan, printing and transfer operations of the embodiment of FIG. 1.

Referring to the time chart shown in FIG. 6, the operation timing of the main elements of the copying mechanism will be described. FIG. 6 concerns the formation of the two same full color copies. When the optical scanning of the first carriage 8 starts, a black and a white density reference plate 47 and 48 of FIG. 1 are read. The plates 47 and 48 having a certain width external along the first carriage 8. The shading correction is performed by correction data based on the read densities of the plates 47 and 48 by means of a shading correction circuit 103 shown in FIG. 2. Substantially simultaneously with the start of the scanning of the original., the laser 43bk starts a modulating excitation on the basis of a record signal. The lasers 43y, 43m and 43c start the corresponding modulating excitation operations delayed by times Ty, Tm, Tc taken for the transfer belt 25 to travel the respective distances between the photosensitive drum 44bk and the respective drums 44y, 44m and 44c. The corotrons 29bk, 29y, 29m and 29c are energized delayed by predetermined times from the start of the modulating excitation operations of the lasers 43bk, 43y, 43m and 43c (by the times taken for the parts of the photosensitive drum surfaces irradiated with laser beams to rotate to the corresponding positions of the corotrons).

Referring to FIG. 2, the reading process unit 101 reads an image on an original. The output signals from the CCDs 7r, 7g and 7b are converted by A/D converters 102r, 102g and 102b to 10-bit digital signals which are then applied to a shading correction circuit 103. The shading correction circuit 103 corrects uneven illumination of the CCD reading optical systems, and uneven sensitivities of, and uneven dark currents in, the photodetection elements in each of the CCDs and outputs the respective 10-bit read color gradation signals R, G and B. The shading correction circuit 103 is constituted by a memory means for storing the read densities of the plates 47 and 48, means for producing a signal representative of an inverse number of the read densities and a multiplexer.

The image process unit 100 includes a γ-correction circuit 104, a color correction circuit 105, a variable power process circuit 106 and a dither process circuit 107. The γ-correction circuit 104, constituted by a table of RAM (Random Access Memory), first performs a logarithmic conversion on the read color gradation signals R, G and B applied thereto. Then it corrects the gradation characteristic of the converted signals in accordance with the instruction from the console 300, and outputs 8-bit read color density signals Dr, Dg and Db for R, G and B.

The color correction circuit 105 performs a masking operation. Namely, it converts input R, G and B signals Dr, Dg and Db to signals Dc, Dm, Dy and Dbk corresponding to C (cyan), M (magenta), Y (yellow) and BK (black) printing colors and the respective toner densities. In this conversion, basic color correction may be performed to correct a deviation from the ideal printing characteristic of the device itself and additional color correction may be carried out in accordance with the instruction from the console board 300.

The respective 8-bit printing color density signals Dc, Dm, Dy and Dbk output from the color correction circuit 105 are applied to the variable power process circuit 106 which performs power varying operations on the corresponding color signals in the direction of main scanning (perpendicular to the direction of movement of the first carriage 8) in accordance with an instruction from the console board 300, and outputs the corresponding 8-bits printing color density signals Dc', Dm', Dy' and Dbk'. A power variation change in the sub-scanning direction (in the direction of movement of the first carriage 8) is performed by changing the moving speed of the first carriage 8. This variable power process circuit 106 is provided with for each color a line buffer and a clock controller, not shown. The clock controller counts synchronous signals (clock signals) from a synchronization control unit 111 and feeds a signal depending upon the instruction from the console board 300. The line buffer passes there through the printing color density signal during one-to-one operation, thins out the printing color density signal during reduction operation and interpolates the printing color density signal during enlargement operation.

The output signal from the power process circuit 106 is applied to the dither process circuit 107 which performs a dither operation on the printing density signals Dc', Dm', Dy' and Dbk' and outputs the respective 3-bit printing color gradation signals C, M, Y and BK. In the dither processing operation, nonlinearity of the gradation of the printing system is also corrected. The dither process circuit 107 is provided with tables constituted by ROM (Read Only Memory) and counters, not shown. The counters count signals from the synchronization control unit 111 to detect where in the image area each of the printing density signals locates. The detected location signals are applied to the address input of the ROM. To the address input, the printing density signals Dc', Dm', Dy' and Dbk' are also applied and thus the respective 3-bit printing color gradation signals C, M, Y and BK are outputed.

In an image printing unit 108, the semiconductor lasers 43c, 43m, 43y and 43bk are energized in accordance with the printing color gradation signals C, M, Y and BK output from the image process unit 100. The BK signal is applied directly to a laser driver 110bk while the other color signals Y, M and C are temporarily stored in buffer memories 109y, 109m and 109c, respectively. When delay times Ty, Tm and Tc shown in FIG. 6 have passed after the BK signal is applied to laser driver 110bk, the contents of the buffer memories 109y, 109m and 109c are read and applied to laser drivers 110y, 110m and 110c, respectively.

The synchronization control unit 111 adjusts input and output timing of signals among the read process unit 101, image process unit 100 and image printing unit 108, and among the elements of each of the units 101, 100 and 108.

A system control unit 112 includes a microcomputer system which comprises a CPU (Central Processing Unit) 113, a ROM (Read Only Memory) 114, RAM (Random Access Memory) 115, I/O (Input/Output) ports 116, 117, 118, 119 and 120 to control the whole copying machine. The system control unit 112 provides synchronization control for the synchronization control unit 111, control of the circuits 104 to 107, and display control of and the detection of the keying operation at the console board 300 and performs predetermined operations in accordance with keyed inputs.

Figure 7:
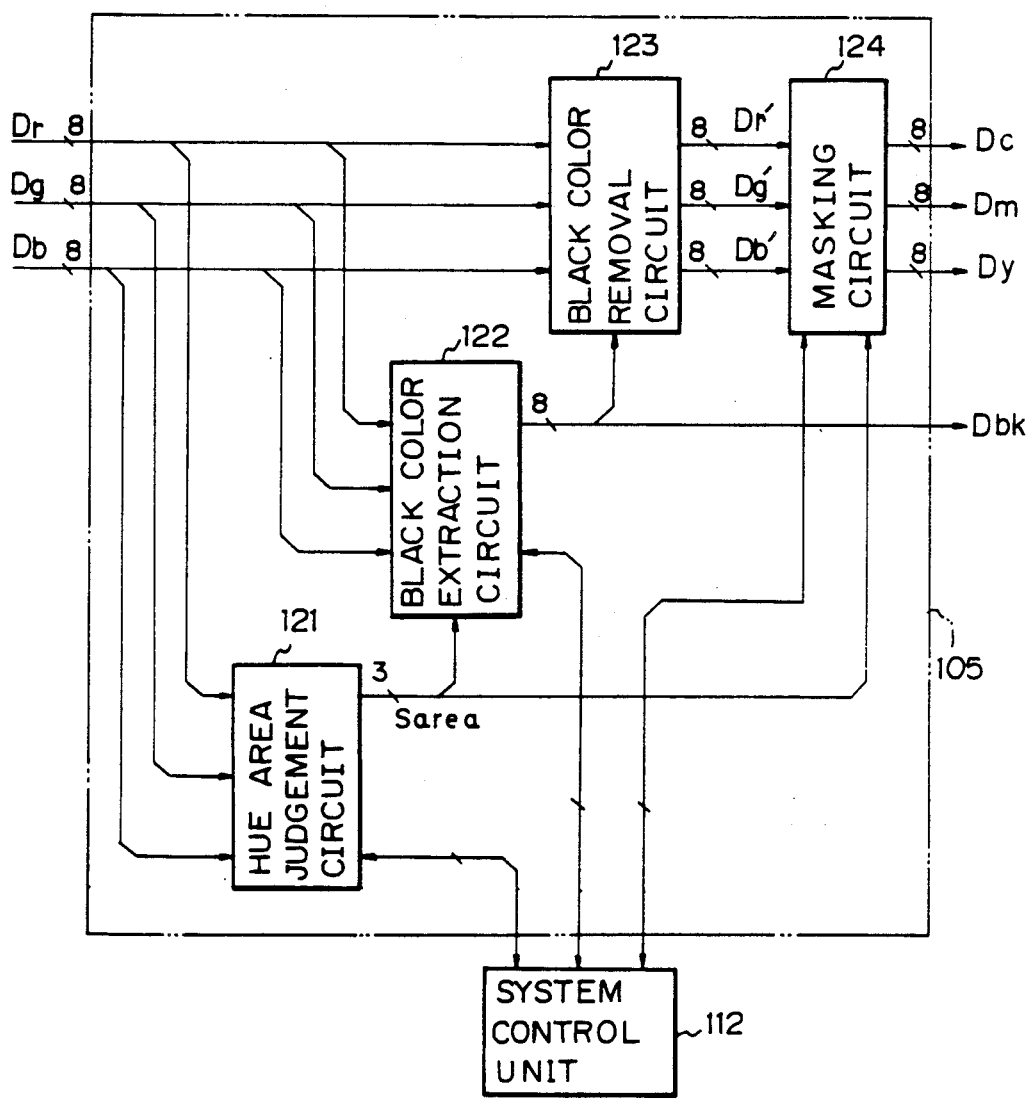
FIG. 7 is a block diagram of a color correction circuit of FIG. 1.

FIG. 7 specifically illustrates an example of the color correction circuit 105 of FIG. 2. As shown in FIG. 7, the color correction circuit 105 includes a hue area judgement circuit 121, a black color extraction circuit 122, a black color removal circuit 123 and a masking circuit 124. The hue area judgement circuit 121 judges to which area of a plurality of predetermined areas each of the input read color density signals Dr, Dg and Db belongs and outputs the results of the judgement as 3-bit hue recognition signals S area.

The black color extraction circuit 122 generates a signal Dbk which determines the printing density of the black toner components from the input read color density signals Dr, Dg and Db. The contents processed by the black color extraction circuit 122 are basically represented by the following formula (1)

$$Dbk = BKr \cdot Dr + BKg \cdot Dg + BKb \cdot Db \qquad (1)$$

where BKr, BKg and BKb are constants which are automatically changed depending on the state of the hue recognition signals S area.

The black color extraction circuit 122 may change the signal Dbk depending on a black color extraction process mode (full-black, skeleton black, etc.) and a UCR (Under Color Removal) rate in accordance with a signal from the system control unit 112. In the full-black mode, UCR operation is carried out for picture elements of any density, and in the skeleton black mode, UCR operation is carried out for picture elements except for these of low density.

The black color removal circuit 123 composed of three subtractors corrects the printing color density signals Dr, Dg and Db in accordance with the printing color density signal Dbk output from the black color extraction circuit 122. The contents of the correction (under color removal operation) are basically represented by the following formula (2), $$Dr' = Dr - Dbk$$

$$Dg' = Dg - Dbk$$

$$Db' = Db - Dbk \qquad (2)$$

The black color removal circuit 123 performs under color removal operations such as those on full-black, skeleton black, etc, in accordance with the processing modes.

The masking circuit 124 generates signals Dc, Dm and Dy representing the respective densities of cyan, magenta and yellow printing toners on the basis of the read color density signals Dr', Dg' and Db'. An error due to a deviation of the actual characteristic of the printing system from the ideal characteristic thereof is corrected by the masking operation. Color adjustment based on the operator's instruction is also performed by this masking operation. The contents processed by masking circuit 124 are represented by the following formulas (3), $$Dc = Kcr \cdot Dr' + Kcg \cdot Dg' + KCb \cdot Db'$$

$$Dm = KMr \cdot Dr' + KMg \cdot Dg' + KMb \cdot Db'$$

$$Dy = KYr \cdot Dr' + KYg \cdot Dg' + KYb \cdot Db' \qquad (3)$$

where KCr, KCg, KCb, KMr, KMg, KMb, KYr, KYg and KYb are constants which are changed automatically in accordance with the state of the hue recognition signal S area.

Figure 8:
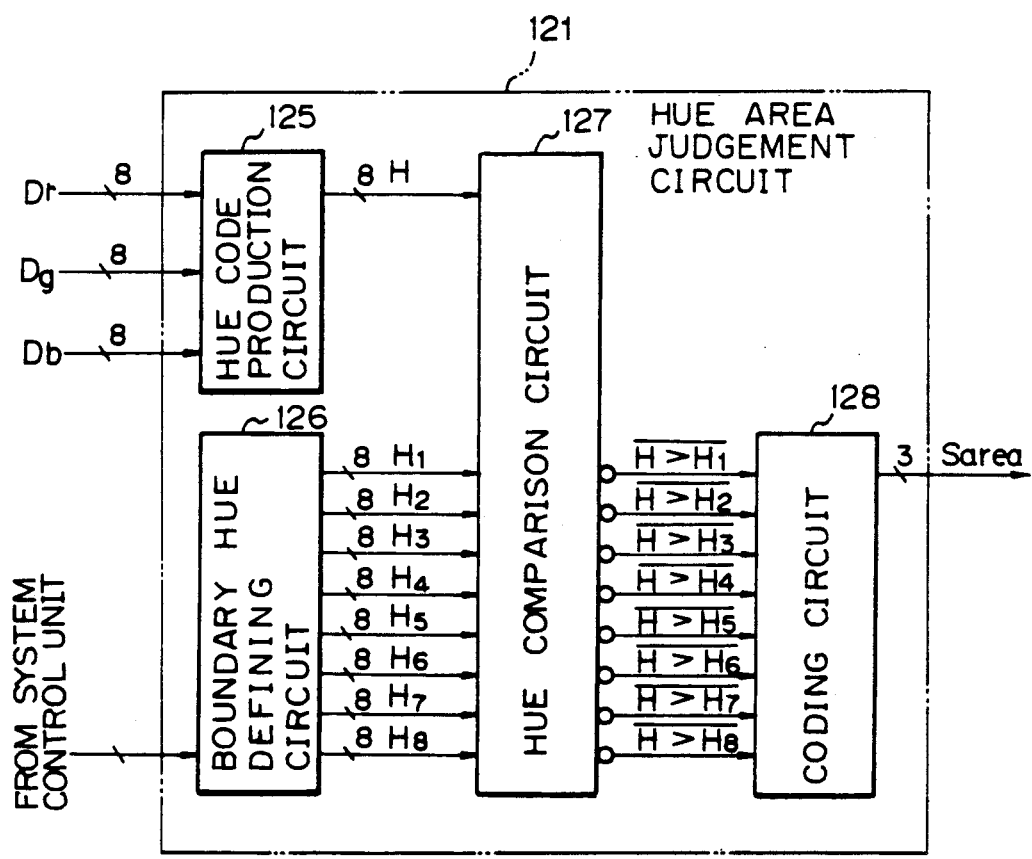
FIG. 8 is a block diagram of a hue area judgement circuit of FIG. 7.

FIG. 8 shows the details of an example of the hue area judgement circuit 121. As shown in FIG. 8, the hue area judgement circuit 121 includes a hue code production circuit 125, a boundary hue defining circuit 126, a hue comparison circuit 127 and a coding circuit 128.

The hue code production circuit 125 constituted by a table of ROM generates 8-bit hue codes corresponding to the hues based on, and represented by, the read color density signals Dr, Dg and Db. The boundary hue defining circuit 126 holds and outputs eight 8-bit data segments. The data held by the boundary hue defining circuit 126 is set by the system control unit 112. The eight 8-bit data segments H1, H2, H3, H4, H5, H6, H7 and H8 being output by the boundary color defining circuit 126 satisfy the relationship represented by the following formula (4), $$H1 \geq H2 \geq H3 \geq H4 \geq H5 \geq H6 \geq H7 \geq H8 \qquad (4)$$

The hue comparison circuit 127 compares an 8-bit code H from the hue code production circuit 125 with each of the eight 8-bit data segments H1 to H8 from the boundary hue defining circuit 126 and outputs eight binary signals indicative of the result of the comparison.

The coding circuit 128 outputs 3-bit signals S area each comprising a coded version of each of eight binary signals (hue comparison result signals) output by the hue comparison circuit 127. The coding is performed in accordance with Table 1 below. The eight 8-bit data segments H1 to H8 from the boundary hue defining circuit 126 are arranged according to significance. Therefore, the number of combinations in a state of eight signals from the hue comparison circuit 127 is nine. In that case, the combination of output signals which are all low, namely, H > H1, and the combination of signals which are all high, namely, H ≤ H8, can be regarded as being in the same hue area because the hue has periodicity. Therefore, the number of combinations of signals from the comparison circuit 127 are eight in all and can be coded to 3-bit signals.

TABLE 1

| HUE COMPARISON RESULT SIGNALS | | | | | | | | CODES |
|---|---|---|---|---|---|---|---|---|
| H > H$_8$ | H > H$_7$ | H > H$_6$ | H > H$_5$ | H > H$_4$ | H > H$_3$ | H > H$_2$ | H > H$_1$ | S area |
| L | L | L | L | L | L | L | L | 7 |
| L | L | L | L | L | L | L | H | 0 |
| L | L | L | L | L | L | H | H | 1 |
| L | L | L | L | L | H | H | H | 2 |
| L | L | L | L | H | H | H | H | 3 |
| L | L | L | H | H | H | H | H | 4 |
| L | L | H | H | H | H | H | H | 5 |
| L | H | H | H | H | H | H | H | 6 |
| H | H | H | H | H | H | H | H | 7 |

Therefore, it can be discerned from the signal S area that the hue of an input image signal comprising a composite of Dr, Dg and Db belongs to which one of the eight areas.

Figure 9:
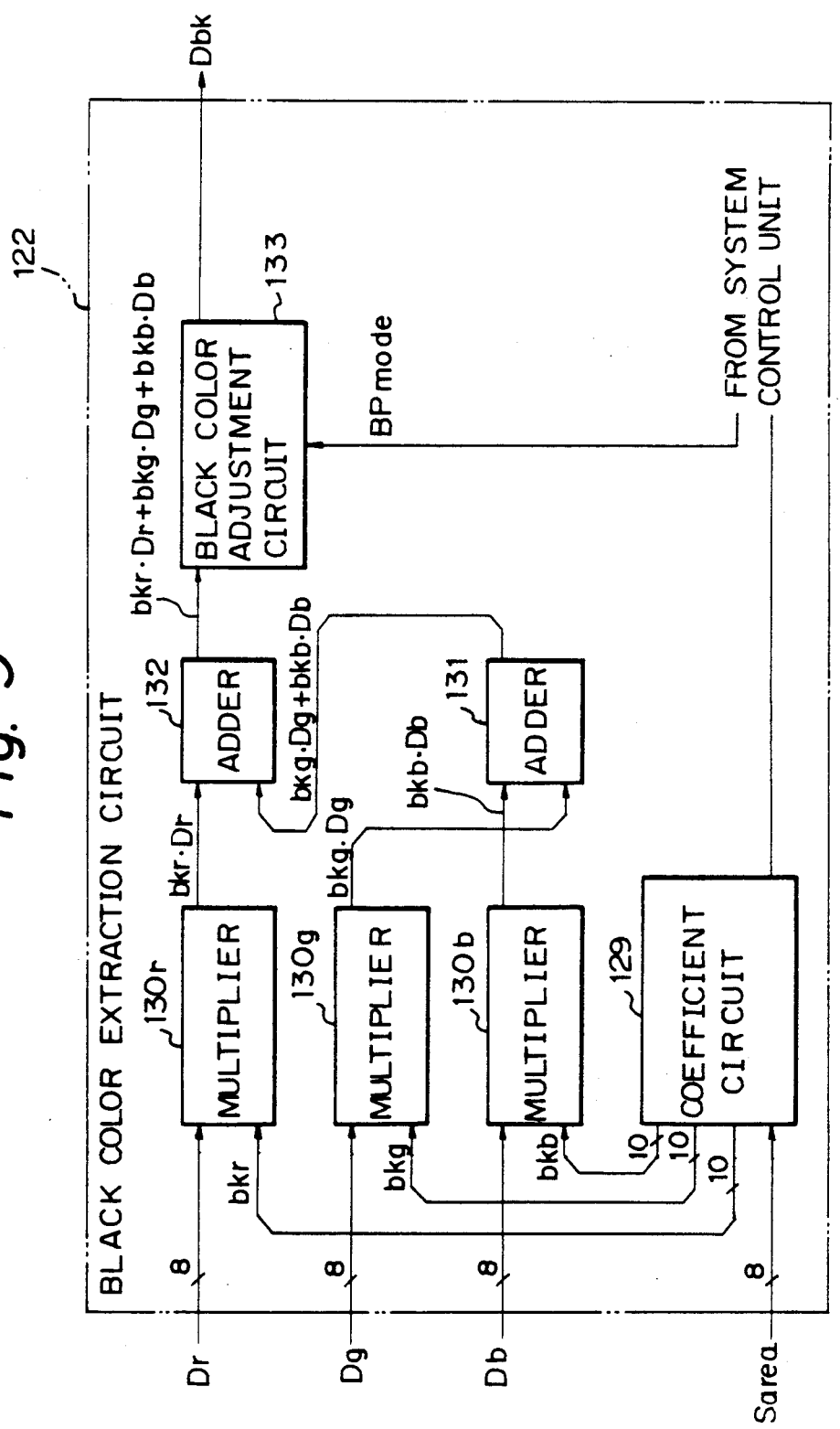
FIG. 9 is a block diagram of a black color extraction circuit of FIG. 7, FIGS. 10 and 11 each are a block diagram of part of a masking circuit of FIG. 7.

FIG. 9 shows the details of the structure of the black color extraction circuit 122 which includes a coefficient circuit 129, multipliers 130r, 130g and 130b, adders 131, 132 and a black color adjustment circuit 133.

The coefficient circuit 129 simultaneously outputs three signals bkr, bkg and bkb which correspond to the coefficients BKr, BKg and BKb, respectively, of formula (1) and have a 10-bit code each. The coefficient circuit 129 holds eight combinations of three coefficients, one combination of which is output in accordance with a hue recognition signal S area. Namely, the coefficients BKr, BKg and BKb are set separately in the corresponding hue areas. The eight combinations of coefficients BKr, BKg and BKb held by the coefficient circuit 129 are overwritten or updated by the system control unit 112 as needed.

The multiplier 130r multiplies the signals Dr and bkr together; 130g, Dg and bkg; and 130b, Db and bkb, and these multipliers output the twelve most significant bits representing the result of the multiplication. The adder 131 adds the output signals from the multipliers 130g and 130b and outputs the result. The adder 132 adds the output signals from the multipliers 130r and adder 131.

Therefore, the output from the adder 132 contains a signal indicative of the result of the calculation of the formula (1). The black color adjustment circuit 133 corrects the overflow and underflow of the value output from the adder 132 and performs required processing in accordance with the black color extraction mode and a signal BP mode indicative of the UCR rate. The result of the processing is output as a signal Dbk.

Figure 10:
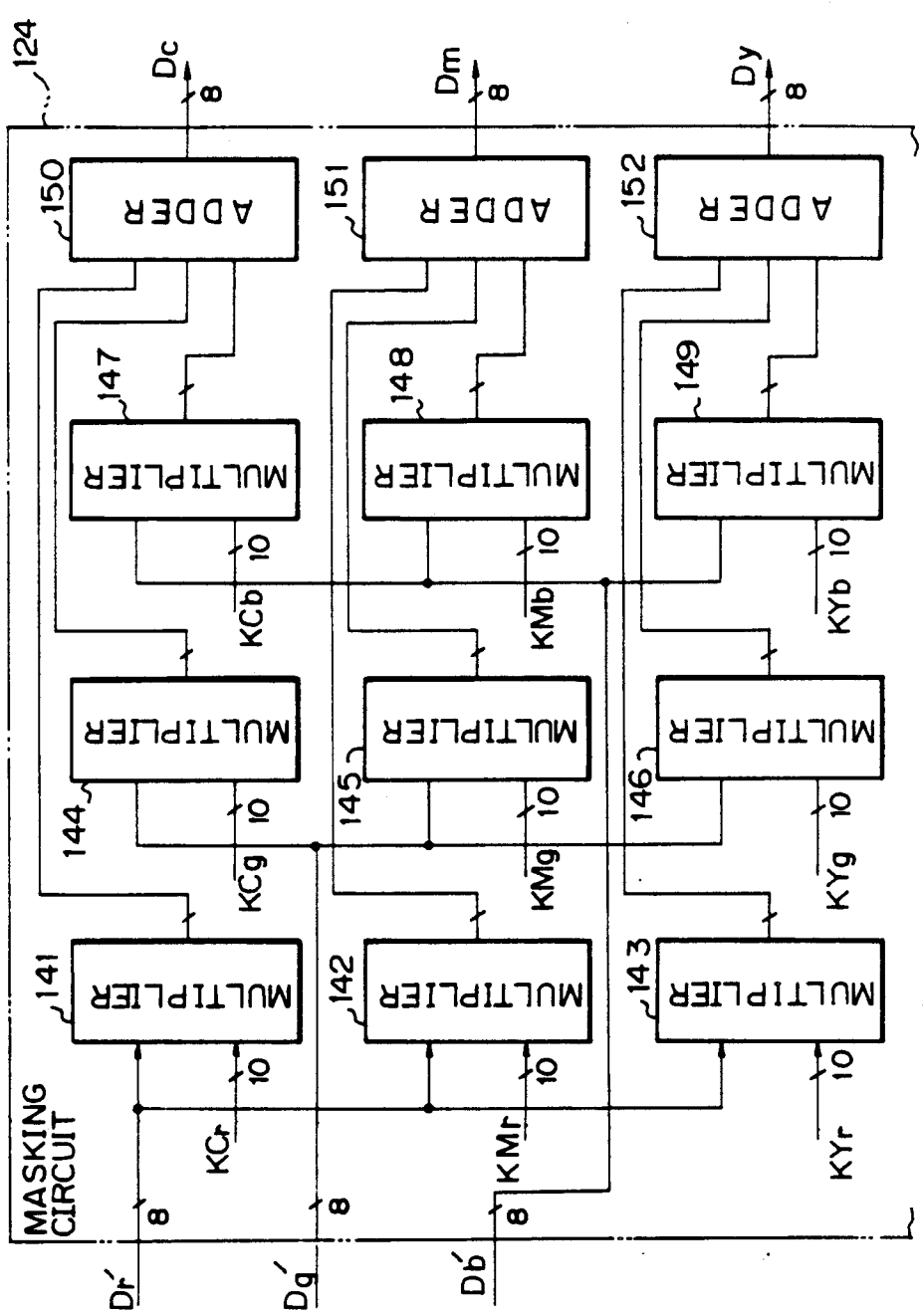

FIG. 10 illustrates the details of part of the structure of the masking circuit 124 which includes nine multipliers 141 to 149 and three adders 150 to 152. The multiplier 141 multiplies the coefficient signal Kcr and density signal Dr' together; 144, KCg and Dg'; 147, KCb and Db'; 142, KMr and Dr'; 145, KMg and Dg'; 148, KMb and Db'; 143, KYr and Dr'; 146, KYg and Dg'; and 149, KYb and Db'. The adder 150 outputs the sum of the signals output by the adders 141, 144 and 147; 151, the sum of the signals output from the multipliers 142, 145 and 148; and 152, the sum of the signals output from the multipliers 143, 146 and 149. That is, the adders 150, 151 and 152 output the results of the calculations shown by the formula (3) and represented by Dc, Dm and Dy.

Figure 11:
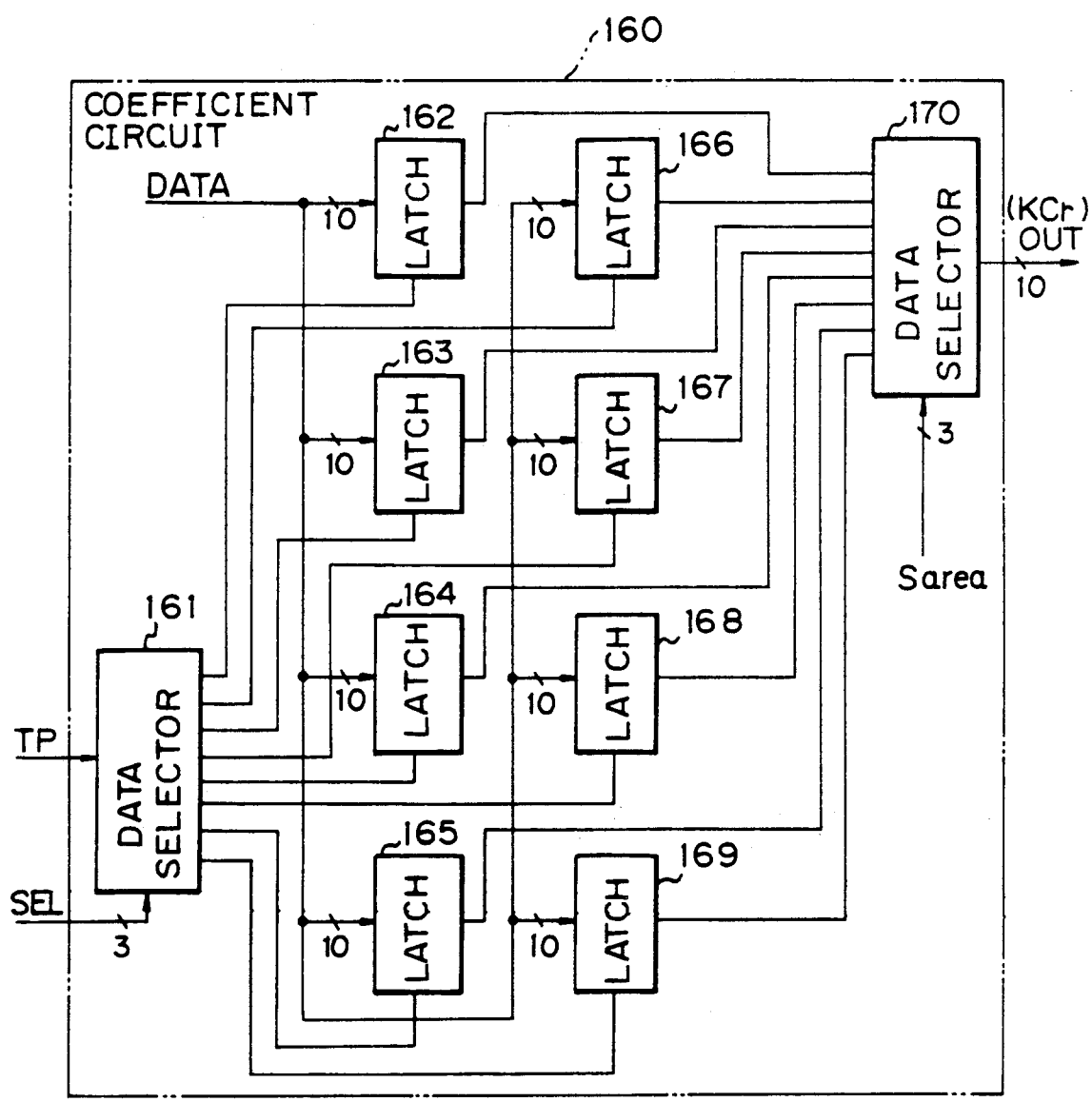

The coefficient signals KCr, KMr and KYr are generated by coefficient circuits not shown in FIG. 10. FIG. 11 shows the structure of one of these coefficient circuits 160 which outputs a coefficient signal KCr to the masking circuit 124 shown in FIG. 10 as one example of the coefficient circuits. As shown in FIG. 11, the coefficient circuit 160 includes data selectors 161 and 170 and eight 10-bit latches 162 to 169. The 10-bit input terminals of the eight latches are connected in common to a 10-bit data line DATA connected to the system control unit 112. The control terminal of each latch is connected to the data selector 161.

The input terminals TP, SEL of the data selector 161 are connected to the output terminals of the system control unit 112. A latch pulse appearing on the signal line TP is selectively applied to one latch determined by the value of the signal line SEL and the coefficient data on the data line DATA is latched. Therefore, the system control unit 112 can write any data with 10-bit codes into the respective eight latches 162 to 169.

The output terminals of the latches 162 to 169 are connected to different input terminals of the data selector 170, 3-bit selection control terminals of which receive a hue recognition signal S area fed from the hue area judgement circuit 121.

The coefficient circuit 160 has eight separate coefficients, one of which is selectively output in accordance with the hue recognition signal S area. The output coefficient is input to the input terminal of the multiplier 141 shown in FIG. 10.

The circuit for producing predetermined coefficients to the multipliers 142 to 149 shown in FIG. 10 has the same structure as the coefficient circuit 160 shown in FIG. 11. The masking circuit 124 has eight sets of separate correction coefficients which are selectively used in accordance with the hue of an input image signal appearing at that time. In other words, different masking is performed for each hue.

The respective coefficients are updatable as requested by the system control unit 112, so that the relationship between the read color and the printed color is changeable. The masking coefficients are separately provided for the respective hue areas, so that if only the coefficients related to a particular hue area are changed, the contents of the masking for other hue areas are not changed. The color of a portion of an image which is greatly different in hue from that of a image portion whose color is to be changed is not changed. Therefore, only a hue whose color is to be adjusted can be changed particularly. This renders color change easy and an error in color adjustment generated due to the fact that the additivity rule of densities does not hold is reduced.

The coefficient circuit 129 shown in FIG. 9 may be formed by a combination of circuits similar to the circuit of FIG. 11.

How to calculate the respective masking coefficients to be set in the masking circuit 124 will now be described. The calculated masking coefficients are stored in the coefficient circuit (not shown) before operation. Each of a plurality of separated hue areas is defined as the area disposed between two particular chromatic colors in a chromaticity diagram and the masking coefficients in each hue area can be calculated from the spectral density characteristics of the two chromatic colors and one achromatic color (gray or black).

In the description below, a total of six colors, i.e., primary colors C, M and Y (solid colors printed in separate cyan, magenta and yellow toners) and secondary colors R, G and B (solid colors printed in two kinds of overlapping toners, namely, magenta and yellow; yellow and cyan; and cyan and magenta) are used as a particular color (hue) which forms the boundary of hue areas, and a third color K (a solid color printed in overlapping cyan, magenta and yellow toners) as an achromatic color. In that case, a hue is divided into six hue areas.

Figure 12:
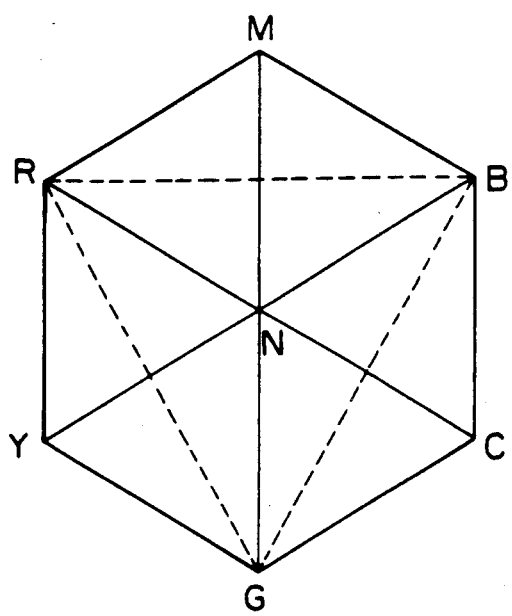
FIG. 12 is a two-dimensional diagram showing the positional relationship between hues R, G, B, Y, M and C.

FIG. 12 shows a ring of C, M, Y, R, G and B colors arranged according to hue and connected by straight line segments. Referring to FIG. 12, it is easy to visually understand the positional relationship between the hues of particular colors and hue areas.

The hue area disposed between the secondary color R and primary color Y will now be described. It is assumed that the additivity rule of densities holds in this hue area where if the spectral printing densities of the secondary color R, primary color Y and third color K are expressed by DR, DY and DK, the presumed values DC', DM' and DY' of the spectral printing densities of the cyan, magenta and yellow toners are given by the following formula (5), $$DC = \begin{bmatrix} DCr \\ DCg \\ DCb \end{bmatrix} = \begin{bmatrix} DKr - DRr \\ DKg - DRg \\ DKb - DRb \end{bmatrix} = DK - DR \quad (5)$$

where DCr and DMg represent the R and G color components of the spectral printing densities of the primary color C and M, respectively.

Similarly, the masking coefficients in other hue areas may be calculated. The results of those calculations are together shown in Table 2 below where the spectral printing densities of the primary colors C, M and Y, secondary colors R, G and B and third color K are represented by DC, DM, DY, DR, DG, DB and DK, respectively, and the R, G and B color components of those densities are identified by the last characters r, g and b, respectively.

TABLE 2

| HUE AREAS | | MASKING COEFFICIENTS | | | |
|---|---|---|---|---|---|
| Y-G | A · | ( DGr-DYr<br>DGg-DYg<br>DGb-DYb | DKr-DGr<br>DKg-DGg<br>DKb-DGb | DYr<br>DYg<br>DYb ) | −1 |
| G-C | A · | ( DCr<br>DCg<br>DCb | DKr-DGr<br>DKg-DGg<br>DKb-DGb | DGr-DCr<br>DGg-DCg<br>DGb-DCb ) | −1 |
| C-B | A · | ( DCr<br>DCg<br>DCb | DBr-DCr<br>DBg-DCg<br>DBb-DCb | DKr-DBr<br>DKg-DBg<br>DKb-DBb ) | −1 |
| B-M | A · | ( DBr-DMr<br>DBg-DMg<br>DBb-DMb | DMr<br>DMg<br>DMb | DKr-DBr<br>DKg-DBg<br>DKb-DBb ) | −1 |
| M-R | A · | ( DKr-DRr<br>DKg-DRg<br>DKb-DRb | DMr<br>DMg<br>DMb | DRr-DMr<br>DRg-DMg<br>DRb-DMb ) | −1 |
| R-Y | A · | ( DKr-DRr<br>DKg-DRg<br>DKb-DRb | DRr-DYr<br>DRg-DYg<br>DRb-DYb | DYr<br>DYg<br>DYb ) | −1 |
| Note: | A = | ( DCr<br>0<br>0 | 0<br>DMg<br>0 | 0<br>0<br>DYb ) | |

$$DM = \begin{bmatrix} DM'r \\ DM'g \\ DM'b \end{bmatrix} = \begin{bmatrix} DRr - DYr \\ DRg - DYg \\ DRb - DYb \end{bmatrix} = DR - DY$$

$$DY = \begin{bmatrix} DY'r \\ DY'g \\ DY'b \end{bmatrix} = \begin{bmatrix} DYr \\ DYg \\ DYb \end{bmatrix} = DY$$

where the respective last characters r, g and b of the symbols represent the corresponding R, G and B light components. Therefore, the respective masking coefficients of the formula (3) are obtained from the following formula (6), $$\begin{bmatrix} KCr & KCg & KCb \\ KMr & KMg & KMb \\ KYr & KYg & KYb \end{bmatrix} = A \cdot \begin{bmatrix} DC'r & DM'r & DY'r \\ DC'g & DM'g & DY'g \\ DC'b & DM'b & DY'b \end{bmatrix}^{-1} \quad (6)$$

$$= A \cdot \begin{bmatrix} DKr - DRr & DRr - DYr & DYr \\ DKg - DRg & DRg - DYg & DYg \\ DKb - DRb & DRb - DYb & DYb \end{bmatrix}^{-1}$$

where A represents coefficients to obtain the result of the masking operation as a printed density value, and given by $$A = \begin{bmatrix} DCr & 0 & 0 \\ 0 & DMg & 0 \\ 0 & 0 & DYb \end{bmatrix}^{-1}$$

The hue will now be described. In the particular embodiment, the hue is basically calculated on the basis of the density ratio of three primaries. This is so because the masking equation is premised on the assumption that the proportionality rule of densities holds. Thus by calculating the hue on the basis of the ratio of spectral densities, color harmony at the boundary between hue areas is improved.

Figure 13:
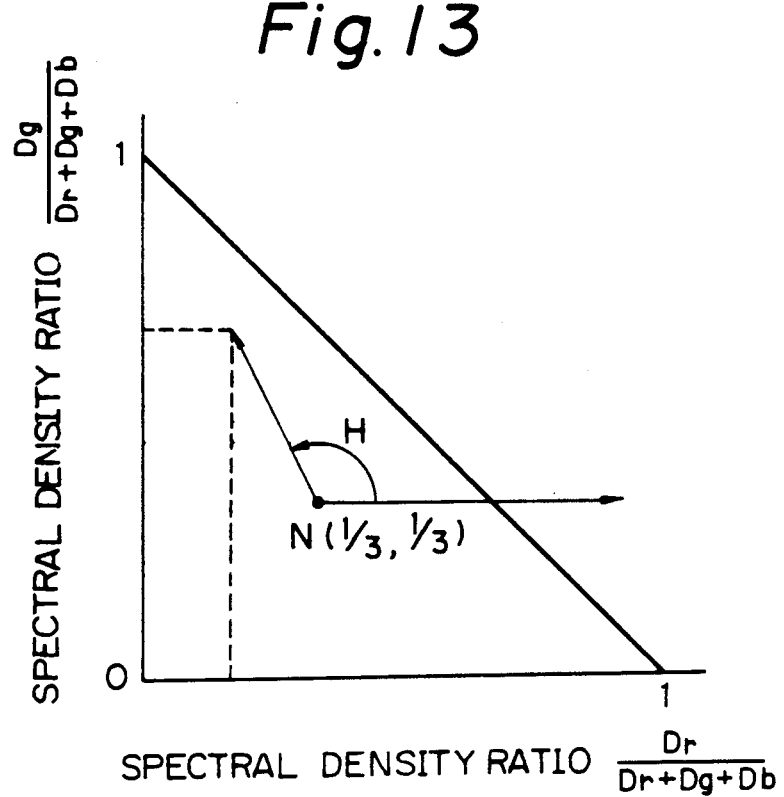
FIG. 13 is a two-dimensional diagram showing one example of chromaticity coordinates.

How to calculate a hue will now be described specifically. The respective spectral density values of R, G and B colors are represented by Dr, Dg and Db, respectively. As shown in FIG. 13, a chromaticity diagram is considered which is defined by two axes corresponding to the spectral density ratios of Dr/(Dr+Dg+Db) and Dg/(Dr+Dg+Db). If a hue H is defined by an angle formed around the position of an achromatic color N (namely, Dr=Dg=Db) relative to the direction of the axis of Dr/(Dr+Dg+Db) in the chromatisity diagram, the relationship between the hue H and spectral density values Dr, Dg and Db are represented by the following formula (7), When 2Dr−Dg−Db>0:

$$H = \tan^{-1}(-Dr + 2Dg - Db)/(2Dr - Dg - Db)$$

When $2Dr - Dg - Db = 0$ and $-Dr + 2Dg - Db \geq 0$:

$$H = \pi/2$$

When $2Dr - Dg - Db = 0$ and $-Dr + 2Dg - Db < 0$:

$$H = -\pi/2$$

When $2Dr - Dg - Db < 0$:

$$H = \pi + \tan^{-1}(-Dr + 2Dg - Db)/(2Dr - Dg - Db) \quad (7)$$

where $-(\pi/2) < \tan^{-1} x < \pi/2$, $-\pi < H \leq \pi$.

The calculation of the formula (7) is carried out by the hue code production circuit 125 shown in FIG. 8. The circuit 125 performs an operation according to the formula (7) on the basis of the three input color density signals Dr, Dg and Db and outputs a code signal H corresponding to the hue.

The boundary hue defining circuit 126 holds eight boundary hue codes corresponding to the code signal H. While in the particular embodiment the hue can be separated into a maximum of eight areas, it is possible to reduce the number of hue areas to seven or less, for example, by allocating the same hue code to memory areas for a plurality of boundary hue codes. When the hue area is divided into the six areas of FIG. 12, the respective hue codes Hc, Hm, Hy, Hr, Hg and Hb for C, M, Y, R, G and B colors are set in the boundary hue defining circuit 126. As mentioned above, the hue comparison circuit 127 compares the magnitudes of the hue and signals from the boundary hue defining circuit. As a result, it is judged which of the six hue areas R-Y, Y-G, G-C, C-B, B-M, and M-R of FIG. 12 the hue of the input signal belongs to, and a signal S area representing a coded version of the judged result is formed.

The above description concerns six hue areas. If the number of hue areas is three or more, advantages are obtained by setting separate masking coefficients in each hue area. An example which handles three boundary hues, each divided into three hue areas, will be briefly described.

It is assumed that the boundary hues are R, G and B. If the hue area disposed between secondary colors R and G is considered, the presumed values Dc', Dm' and Dy' of the spectral printing densities of cyan, magenta and yellow toners in that area are represented by the following formula (8), $$Dc' = Dk - Dr$$

$$Dm' = Dk - Dg$$

$$Dy' = Dr + Dg - Dk \quad (8)$$

The masking coefficients in this case can be calculated by calculating inverse matrices similar to those in Table 2 on the basis of the formula (8). This applies similarly to other hue areas.

If a hue area disposed between the primary colors Y and C is considered, the presumed values of Dc', Dm' and Dy' of the spectral printing densities of cyan, magenta and yellow toners in this area are represented by the following formula (9), $$Dc' = Dc$$

$$Dm' = Dk = Dc = Dy$$

$$Dy' = Dy \quad (9)$$

The respective masking coefficients in this case can be obtained by calculating an inverse matrix similar to Table 2 on the basis of the formula (9). This applies similarly to other hue areas.

While in the above description the boundary hue is described as comprising the primary and secondary colors alone, it may be set to any intermediate hue. Here, an example in which a printed color O positioned in an intermediate hue between the secondary color R and primary color Y is the boundary hue will be considered. Hereinafter, the printed color O will be defined as one obtained when a cyan toner is printed at an R color printing density Docr, a magenta toner at a G color printing density Domg, and a yellow toner at a B color printing density Doyb, and when these printing are overlapped each other.

The presumed values Dc', Dm' and Dy' of the spectral printing densities of cyan, magenta and yellow toners in the hue area disposed between the secondary color R and intermediate color O are given by the following formula (10), $$Dc' = Dk = Dr$$

$$Dm' = (Or \cdot Dk - Do + (Ob - Or)Dr)/(Ob - Og)$$

$$Dy' = (-Or \cdot Dk + Do + (Or - Og)Dr)/(Ob - Og)$$

where $Or = Docr/DCr$, $Og = Domg/DMg$, $Ob = Doyb/DYb$, and Do indicates the spectral printing density of the intermediate color O.

The respective masking coefficients in this case can be obtained by calculating inverse matrices similar to those in Table 2 on the basis of the formula (10). This applies similarly to other hue areas.

Similarly, the presumed values Dc', Dm' and Dy' of the spectral printing densities of cyan, magenta and yellow toners in the hue area disposed between the primary color Y and intermediate color O are given by the following formula (11), $$Dc' = (Do - Og \cdot Dk - (Ob - Og)Dy)/(Or - Og)$$

$$Dm' = (Or \cdot Dk + (Ob - Or)Dy - Do)/(Or = Og)$$

$$Dy' = Dy \quad (11)$$

The respective masking coefficients in this case can be obtained by calculating inverse matrices similar to those in Table 2 on the basis of the formula 11). This applies similarly to other hue areas.

While in the above description the hue is defined in the hue diagram represented by the two axes corresponding to the spectral density ratios of $Dr/(Dr + Dg + Db)$ and $Dg/(Dr + Dg + Db)$, it may be defined using other methods.

Figure 14:
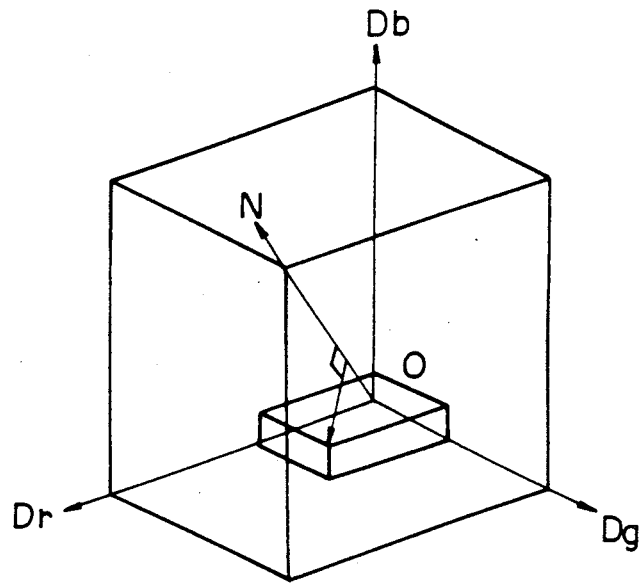
FIGS. 14 and 15 are perspective views of three-dimensional color spaces, and FIGS. 16a, 16 b and 16c are front views of illustrative displays on a touch panel display of FIG. 5, respectively.
Figure 15:
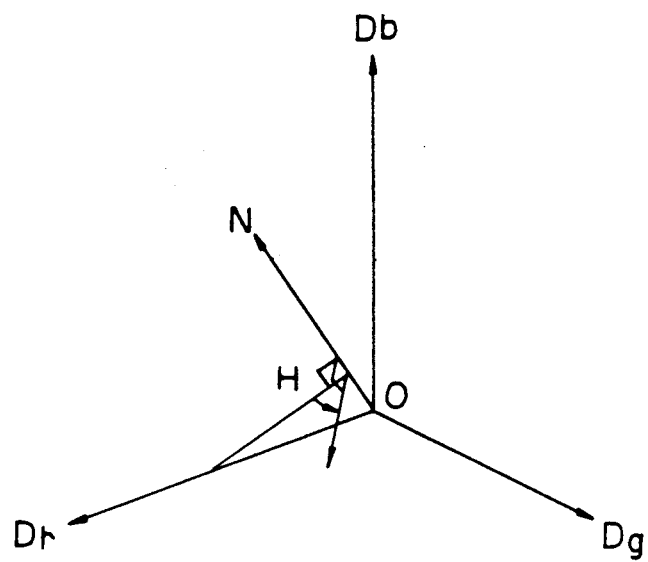

For example, as shown in FIGS. 14 and 15, a three dimensional color space (Dr, Dg, Db) with three color (R, G, B) axes is considered and a plane orthogonal to an achromatic color axis $N(Dr = Dg = Db)$ is provided so as to correspond to a hue diagram. A hue H can be defined as the angle formed around an achromatic color axis $(Dr = Dg = Db)$ from a hue reference $(H = 0)$ to a position on the hue diagram projected in the direction of the achromatic color axis N. In that case, if the direction of the Dr axis is taken as the hue reference, and the direction of the Dg axis is assumed to be positive, the relationship between the hue H and spectral density values Dr, Dg, Db is given by the following formula (12), $$\text{When } Dg > Db: \quad (12)$$
$$H = \cos^{-1} \frac{2DR - Dg - Db}{2\sqrt{Dr^2 + Dg^2 + Db^2 - DrDg - DgDb - DbDr}}$$

When $Dg = Db$ and
$2Dr - Dg - Db \geq 0$:

$$H = 0$$

When $Dg = Db$ and
$2Dr - Dg - Db < 0$:

$$H = \pi$$

When $Dg < Db$:

$$H = -\cos^{-1} \frac{2Dr - Dg - Db}{2\sqrt{Dr^2 + Dg^2 + Db^2 - DrDg - DgDb - DbDr}}$$

where $0 < \cos^{-1} x < \pi - \pi < H \leq \pi$.

As will be seen in the formula (12), also in this case, the hue H can be defined on the basis of the ratio of the spectral density values. If the hue H is defined on the basis of the formula (7), the positions assumed by the hue coordinates on the hue diagram form a triangle and are asymmetrical with reference to the center N, as shown by the broken lines in FIG. 12. Therefore, a visual hue does not satisfactorily correspond to a hue obtained by calculation. However, if a hue is defined on the basis of the formula (12), an area formed by the hue coordinates on the hue diagram is symmetrical with reference to the center N, so that the visual hue corresponds satisfactorily to that obtained by calculation.

Color correction will now be described which is performed when an image is printed in full black, for example, using a black toner and other two kinds of toners. Also in this case, the color space (Dr, Dg, Db) are divided into three or more areas according to hue and masking coefficients are allocated to those areas, as mentioned above. In this case, it is necessary to contain colors each of which is printed in each of cyan, magenta and yellow toners, respectively, as the boundary colors specifying the hue areas. The masking coefficients are calculated from the spectral density values of two boundary colors defining the hue area for the masking coefficients and of the color printed in black toner alone.

The following description shows an example in which six colors of primary colors C, M, Y and secondary colors R, G and B, and primary color BK (solid color printed in black toner) as the color printed in black toner alone are used as the boundary colors defining the hue areas and in which six separated hue areas are used.

Masking coefficients for the hue area disposed between secondary color R and primary color Y will first be calculated. If the additivity rule of densities holds in this area, the presumed values of Dm', Dy' and Dbk of the spectral printing densities of magenta, yellow and black toners in this area are calculated by the following formula (13), $$Dm' = \begin{bmatrix} DM'r \\ DM'g \\ DM40b \end{bmatrix} = \begin{bmatrix} DRr \\ DRg \\ DRb \end{bmatrix} = Dr - Dy \quad (13)$$

$$Dy' = \begin{bmatrix} DY'r \\ DY'g \\ DY'b \end{bmatrix} = \begin{bmatrix} DYr \\ DYg \\ DYb \end{bmatrix} = Dy$$

$$Dbk' = \begin{bmatrix} DBK'r \\ DBK'g \\ DBK'b \end{bmatrix} = \begin{bmatrix} DBK \\ DBK \\ DBK \end{bmatrix} = Dbk$$

where Dr, Dy, Dbk denote the spectral printing densities of secondary color R, and primary colors Y and BK, respectively, and the last characters r, g and b of the respective symbols denote R, G and B color components, respectively.

Therefore, the masking coefficients in this hue area are given by the following formula (14), $$\begin{bmatrix} KMr & KMg & KMb \\ KYr & KYg & KYb \\ KBKr & KBKg & KBKb \end{bmatrix} = A \cdot \begin{bmatrix} DM'r & DY'r & Dbk' \\ DM'g & DY'g & Dbk' \\ DM'b & DY'b & Dbk' \end{bmatrix}^{-1} \quad (14)$$

$$= A \cdot \begin{bmatrix} DRr-DYr & DYr & DBKr \\ DRg-DYg & DYg & DBKg \\ DRb-DYb & DYb & DBKb \end{bmatrix}^{-1}$$

where A denotes coefficients for obtaining the result of the masking operation as the printing density values, and given by $$A = \begin{bmatrix} DMg & 0 & 0 \\ 0 & DYb & 0 \\ 0 & 0 & DBKg \end{bmatrix}$$

Dmg denotes the G color component of the spectral printing density of the primary color M. In the hue area, the printing density of the cyan toner becomes zero (Cr=Cg=Cb=0).

Similarly, masking coefficients in other hue areas can be calculated. These results are shown together in Table 3 below in which the spectral printing densities of primary colors C, M, Y, BK and secondary colors R, G and B are denoted by DC, DM, DY, DBK, DR, DG and DB, respectively, and the R, G and B components of those densities are identified with the last characters r, g and b.

TABLE 3

| HUE AREAS | MASKING COEFFICIENTS |
|---|---|
| Y-G | $\begin{pmatrix} KYr & KYg & KYb \\ KCr & KCg & KCb \\ KBKr & KBKg & KBKb \end{pmatrix} = AG \cdot \begin{pmatrix} DYr & DGr - DYr & DBKr \\ DYg & DGg - DYg & DBKg \\ DYb & DGb - DYb & DBKb \end{pmatrix}^{-1}$ <br> $KMr = KMg = KMb = 0$ |
| G-C | $\begin{pmatrix} KYr & KYg & KYb \\ KCr & KCg & KCb \\ KBKr & KBKg & KBKb \end{pmatrix} = AG \cdot \begin{pmatrix} DGr - DCr & DCr & DBKr \\ DGg - DCg & DCg & DBKg \\ DGb - DCb & DCb & DBKb \end{pmatrix}^{-1}$ <br> $KMr = KMg = KMb = 0$ |
| C-B | $\begin{pmatrix} KCr & KCg & KCb \\ KMr & KMg & KMb \\ KBKr & KBKg & KBKb \end{pmatrix} = AB \cdot \begin{pmatrix} DCr & DBr - DCr & DBKr \\ DCg & DBg - DCg & DBKg \\ DCb & DBb - DCb & DBKb \end{pmatrix}^{-1}$ <br> $KYr = KYg = KYb = 0$ |
| B-M | $\begin{pmatrix} KCr & KCg & KCb \\ KMr & KMg & KMb \\ KBKr & KBKg & KBKb \end{pmatrix} = AB \cdot \begin{pmatrix} DBr - DMr & DMr & DBKr \\ DBg - DMg & DMg & DBKg \\ DBb - DMb & DMb & DBKb \end{pmatrix}^{-1}$ <br> $KYr = KYg = KYb = 0$ |
| M-R | $\begin{pmatrix} KMr & KMg & KMb \\ KYr & KYg & KYb \\ KBKr & KBKg & KBKb \end{pmatrix} = AR \cdot \begin{pmatrix} DMr & DRr - DMr & DBKr \\ DMg & DRg - DMg & DBKg \\ DMb & DRb - DMb & DBKb \end{pmatrix}^{-1}$ <br> $KCr = KCg = KCb = 0$ |
| R-Y | $\begin{pmatrix} KMr & KMg & KMb \\ KYr & KYg & KYb \\ KBKr & KBKg & KBKb \end{pmatrix} = AR \cdot \begin{pmatrix} DRr - DYr & DYr & DBKr \\ DRg - DYg & DYg & DBKg \\ DRb - DYb & DYb & DBKb \end{pmatrix}^{-1}$ <br> $KCr = KCg = KCb = 0$ | where:

$$AR = \begin{pmatrix} DMg & 0 & 0 \\ 0 & DYb & 0 \\ 0 & 0 & DBKg \end{pmatrix}$$

$$AG = \begin{pmatrix} DYb & 0 & 0 \\ 0 & DCr & 0 \\ 0 & 0 & DBKg \end{pmatrix}$$

$$AB = \begin{pmatrix} DCr & 0 & 0 \\ & DMg & 0 \\ 0 & 0 & DBKg \end{pmatrix}$$

While the above example has been described as relating to the six hue areas, color correction for full black may be performed similarly even if the number of hue areas is any number equal to or greater than three. As the boundary hues, not only primary colors C, M and Y and secondary colors R, G and B, but also intermediate colors may be employed as in the printing using cyan, magenta and yellow toners The masking coefficients shown in Table 3 is corrected to a density for printing in black toner. Therefore, it is not required to correct a black component such as that shown in the formula (2) when print is performed in full-black. When a black component correction such as that shown in the formula (2) is required, the density values Dr', Dg' and Db' corrected in black component are processed using the coefficients shown in Table 2. This method has the advantage that individual judgements on the hue areas are not required.

Table 4 below shows printing paper W, primary colors C, M and Y, secondary colors R, G and B, third color K and primary color BK and their spectral printing densities in a digital color copying machine shown in FIG. 1. Table 5 below shows the results of correction of the spectral printing densities shown in Table 4 relative to the spectral printing density of the printing paper W.

TABLE 4

|    | Dro   | Dgo   | Dbo   |
|----|-------|-------|-------|
| W  | 0.079 | 0.091 | 0.090 |
| C  | 1.439 | 0.610 | 0.252 |
| M  | 0.217 | 1.086 | 0.569 |
| Y  | 0.099 | 0.129 | 0.866 |
| R  | 0.226 | 1.145 | 1.457 |
| G  | 1.336 | 0.607 | 0.971 |
| B  | 1.462 | 1.407 | 0.657 |
| K  | 1.465 | 1.456 | 1.384 |
| BK | 1.584 | 1.626 | 1.587 |

TABLE 5

|    | Dro   | Dgo   | Dbo   |
|----|-------|-------|-------|
| W  | 0.000 | 0.000 | 0.000 |
| C  | 1.360 | 0.519 | 0.162 |
| M  | 0.138 | 0.995 | 0.479 |
| Y  | 0.020 | 0.038 | 0.776 |
| R  | 0.147 | 1.054 | 1.367 |
| G  | 1.257 | 0.516 | 0.881 |
| B  | 1.383 | 1.316 | 0.567 |
| K  | 1.386 | 1.365 | 1.294 |
| BK | 1.505 | 1.535 | 1.497 |

Supplemental description on the color correction will be given on the basis of the actual spectral density values shown in Table 5. In the description below, primary colors C, M and Y and secondary colors R, G and B will be used as the boundary colors of the hue areas.

As shown in Table 5, the third color K and primary color BK are not entirely an achromatic color (Dr=Dg=Db). Therefore, if masking coefficients such as those shown in Table 2 are calculated by regarding third color K as gray or black and the hue area is determined in the formula (7), etc., the reproducibility of a color close to an achromatic color may be deteriorated, particularly in a high density area. This is so because although the hue must naturally be detected with the straight line connecting the origin W and third color K as the center in the color space (Dr, Dg, Dg), it is detected with an achromatic color as the center and hence the hue area may be determined erroneously. Therefore, when strict color correction must be made, it is preferable to use a hue with a straight line connecting the origin W and third color K as the center or to use an intermediate color which will be a complete achromatic color, instead of the third color K.

In the former case, constants $\alpha$, $\beta$, $\gamma$ which satisfy the following formula (15) are calculated, $$\alpha \cdot Dkr = \beta \cdot Dkg = \gamma \cdot Dkb \quad (15)$$

where $\alpha \neq 0$, $\beta \neq 0$ and $\gamma \neq 0$. The spectral printing densities Dr, Dg and Db of Table 5 are corrected by multiplying the Dr, Dg, Db by $\alpha$, $\beta$ and $\gamma$, respectively, and the boundary hue is determined in the formula (7), etc. The read color densities Dr, Dg and Db are also corrected by multiplying these densities Dr, Dg and Db by $\alpha$, $\beta$ and $\gamma$, respectively, and then to detect the hue. In the latter case, color adjustment is achieved by adjusting the quantities of printed cyan, magenta and yellow toners.

This applies when masking coefficients such as those shown in Table 3 using the primary color BK are calculated and required processing is then performed. In that case, the printed color does not become a complete achromatic color even if printed by the black toner with the intermediate level, so that the use of an intermediate color on a straight line connecting the origin W and the primary color BK is advantageous in that the detection of hues can be performed in common.

The process for color adjustment satisfying the user's taste and intentional color change will now be described. In the device of the particular embodiment, the system control unit 112 is capable of optionally rewriting coefficients for masking operation (masking coefficients) and boundary hues. If the masking coefficients are changed, the color conversion characteristic of the masking circuit 124 is changed and hence colors are corrected.

The following description concerns adjustment of the secondary color R which is one of the boundary hues and a color close thereto.

If the secondary color R and a color close thereto of an image printed by the copying machine of FIG. 1 are to be adjusted because, for example, a tincture of yellow is low, the quantity of the yellow toner component of that color should be adjusted to increase. As mentioned above, in the embodiment, the hue is divided into a plurality of areas in which corresponding separate masking coefficients are set, so that particular hue portions, namely, R color and the hue in the vicinity thereof alone can be selectively adjusted. Namely, when masking coefficients are calculated in accordance with the formulas shown in Tables 2 and 3, the resulting masking coefficients serve to perform predetermined color adjustment or increase, for example, a tincture of yellow in the R color by correcting the spectral density value of the R color, etc., contained in the formulas.

More specifically, the blue color component (1.367) having a stoichiometric value (Table 5 value) preset as the spectral density value of the secondary color R to be printed is adjusted to a lesser degree than other color components, and the formulas in Tables 2 or 3 are calculated in accordance with the adjusted spectral density value to provide adjusted masking coefficients. By reducing the B color component in the spectral density of the printed color R, the yellow toner is regarded as absorbing a lesser quantity of the blue light component than before. Therefore, the quantity of printed yellow toner is adjusted so as to increase by performing the masking operation using the masking coefficients obtained on the basis of the results of the calculation. The quantity of adjustment increases as the hue is closer to R color and as the saturation is higher.

It is to be noted that color adjustment is performed in only the two hue areas M-R and R-Y containing R color to be adjusted. In this case, since the color to be adjusted is R color, the masking coefficients belonging to the hue areas M-R and R-Y are updated. The masking coefficients for other hue areas are not updated and color adjustment is not required. The colors of an achromatic color are substantially determined by the spectral density values of the third color K and primary color BK, so that they are not influenced by the adjustment of the R color.

When this adjustment is performed, the hue of the secondary color R is changed, so that the hue of the boundary color R which determines the hue area shifts. Thus in the particular embodiment, the system control unit 112 automatically calculates the hue of R color after the shift and simultaneously updates the boundary hue of the R color held by the boundary hue hold circuit 126 on the basis of the result of the calculation so as to corresponds to the shift of the hue.

There is a method of calculating masking coefficients in which, for example, an intermediate color having a spectral density equal to that of the secondary color R is regarded as a particular color replacing the secondary color R, and the intermediate color is also regarded as being printed in a quantity of magenta toner equal to that of the secondary color R and a greater quantity of yellow toner. In that case, the hue of the intermediate color is equal to that of the secondary color R, so that it is changed with only the masking coefficients of the hue areas M-R and R-Y, and the boundary hue which is used to determine the hue area is not required to be changed.

If the saturation of a color having a hue close to the hue of the secondary color R on the printed image is insufficient, the quantity of cyan toner to be printed in that portion should be reduced. In order to realize that, the red color component (0.147) have a stoichiometric value (a value in Table 5) preset as the spectral density value of the secondary color R to be printed should be corrected more greatly than other color components and masking coefficients should be calculated on the basis of the results of the correction. There is another method of calculating masking coefficients in which an intermediate color having a spectral density equal to that of the secondary color R is regarded as a particular color replacing the secondary color R, and the intermediate color is regarded as being printed in the quantities of magenta and yellow toners equal to that of the secondary color R and a trace of cyan toner. While the above description concerns the adjustment of the secondary color R and a color close to that, a similar method may be employed for adjustment of other colors.

At all events, in the particular embodiment, masking coefficients are set in the corresponding hue areas and can be adjusted to change only color of a desired hue portion to another color. A change of the masking coefficients is achieved by correcting the spectral density value (Table 5) and quantity of print of a particular color used to calculate the masking coefficients. The hues at the boundaries of the hue areas can be adjusted freely so long as the sequence of the colors is not lost.

The operator's operation for color adjustment and the operation of the copying machine of FIG. 1 corresponding thereto will now be described. FIGS. 16a, 16b and 16c show illustrative display contents on a touch panel display 307 provided on the console board 300 of FIG. 5. FIG. 16a shows the display contents in a standard mode in which when the "color tone adjustment" portion is pressed on the display, the display 307 screen changes to that of FIG. 16b.

In the screen of FIG. 16b, a specific color to be adjusted can be designated. Namely, C, M, Y, R, G and B colors are designated by as specific colors by pressing the corresponding symbol portions "C", "M", "Y", "R", "G" and "B", respectively. If the "reset" is pressed, the contents of color adjustment are cleared and standard values (initial device values) are set as masking coefficients. If "adjustment end" is pressed, the device returns its standard mode and the contents of display change to those of FIG. 16a.

If, for example, "R" is pressed in a specific color designation mode shown in FIG. 16b, the contents of the display screen change to those of FIG. 16c where the lightness, saturation and hue of a designated specific color can be adjusted. The display of the central screen portion is a one-dimensional index showing a quantity of lightness adjustment, and the display of a lower screen is a two-dimensional index showing the quantities of hue and saturation adjustment. A going-on-and-off portion (shown in a black dot) shows the quantity of adjustment (set value) at that time. In this example, the lightness, saturation and hue can be adjusted in seven steps.

Each time the right-hand "red purple" on the two-dimensional index is pressed, the going-on-and-off portion on the index shifts one step rightward. This causes the masking coefficients to be adjusted such that the "red purple" is intensified, namely, in the direction in which the hue of the particular color approaches "red purple". Each time the left-hand "yellow" on the two-dimensional index is pressed, the going-on-and-off portion on the index shifts one step leftward, which causes the masking coefficients to be adjusted such that the yellow color is intensified, namely, in the direction in which the hue of the particular color approaches yellow color.

Each time the "brilliant" on the upper side of the two-dimensional index is pressed, the going-on-and-off portion on the index shifts one step upwardly, which causes the masking coefficients to be adjusted in the direction in which the saturation of the particular color increases. Each time the "grayish" on the lower side of the two-dimensional index is pressed, the going-on-and-off portion on the index shifts one step downwardly, which causes the masking coefficients to be adjusted in the direction in which the saturation of the particular color is reduced.

Similarly, each time the right-hand "light" on the one-dimensional index is pressed, the going-on-and-off portion on the index shifts one step rightward, which causes the lightness of the particular color to be printed to be increased. Each time the left-side "dark" on the one-dimensional index is pressed, the going-on-and-off portion on the index shifts one step leftward, which causes the lightness of the particular color to be recorded to be reduced.

The hue adjustment mode of the particular color R is ended by pressing the "end" portion and the specific color designation mode is resumed. Even when other colors are selected as particular colors, the operations are basically the same as those with the selection of the R color. If the designation of a particular color is changed, the hue area whose masking coefficients are to be adjusted changes and the contents ("yellow", "red purple" showing the hues) displayed on the screen are changed, but others are maintained unchanged.

The system control unit 112 adjusts the hue, saturation and lightness of a designated specific color by correcting the spectral density value and quantity of print of the specific color in accordance with the above input adjustment.

For example, the spectral density value of a particular color R is amended as follows. If the hue and saturation are of standard values and the lightness alone is to be adjusted, a spectral density value corresponding to a spectral luminous efficiency is added to, or subtracted from, the spectral density value of the particular color R in accordance with the quantity of lightness adjustment. If a hue alone is to be adjusted, for example, if a tincture of yellow is to be intensified, the blue light component (1.367) of the spectral density value (Table 5) of the particular color R is reduced in accordance with the quantity of hue adjustment while the red and green light components (0.147 and 1.054, respectively) are slightly increased such that the saturation and lightness of the particular color do not change. If the saturation alone is to be adjusted when the particular color is R, the red light component of the spectral density value of the particular color R is adjusted in accordance with the quantity of saturation arrangement while the green and blue light components are adjusted such that the hue and lightness of the particular color do not change. Of course, color adjustment involving a combination of lightness, saturation and hue is also possible.

As just described above, the system control unit 112 corrects the spectral density value and quantity of print of a particular color in accordance with the hue, saturation and lightness set in the color tone adjustment mode. When the end of the color tone adjustment is selected, the masking coefficients in the respective hue areas and, as needed, even the hue of the particular color are calculated, and the results are fed to the color correction circuit 105 to terminate the processing concerning the color adjustment.

As described above, according to the present invention, predetermined color adjustment is completed only by setting a color to be adjusted and a quantity of adjustment of the color, so that the operation of the color adjustment is very easy.

Color error due to the fact that the additivity rule of densities does not hold is reduced and correct color correction is achieved by dividing a hue into three or more areas, allocating separate color correction coefficients to the corresponding hue areas and performing color correction or adjustment. Adjustment of any color is easy because the hue of the color to be adjusted is limited within part of the hue area.

When an achromatic color component signal is to be extracted from a color signal, an error involved in the extraction of an achromatic color component due to the fact that the additivity rule of densities does not hold is reduced and correct color is reproduced by allocating separate values of extraction parameters to the corresponding separate hue areas.

Many widely different embodiments of the present invention may be constructed without departing from the spirit and scope of the present invention. It should be understood that the present invention is not limited to the specific embodiments described in this specification, except as defined in the appended claims.

What is claimed is:

1. A color correction device for correcting input image signals of basic colors, representative of color-separated input images, to produce output image signals of other basic colors, representative of output images for printing, said device comprising:

an input means for receiving information of colors related to the input images and to the output images;

a hue area judgement means for judging to which hue area among at least three predetermined hue areas the hue represented by said input image signals belongs:

a parameter setting means for setting color correction parameters in accordance with the received information by said input means and with the hue area judged by said hue area judgment means; and a color conversion means for converting said input image signals to the output image signals by using said set color correction parameters, so that the input image signals are corrected in accordance with the hue area judged with respect to the same input image signals.

2. A device as claimed in claim 1, wherein said hue area judgment means includes a plurality of multipliers with each multiplier receiving one of said color correction parameters and one of said input signals for producing a product signal, and a plurality of adders corresponding in number to the number of said other basic colors for adding together the product signals related to the same corresponding color.

3. A device as claimed in claim 1, wherein said parameter setting means comprises a parameter hold means for holding color correction parameters the number of which is equal to or greater than the number of said predetermined hue areas, and a selection means for selecting a part of the color correction parameters held in said parameter hold means in accordance with the hue area judged by said hue area judgement means.

4. A device as claimed in claim 1, wherein said parameter setting means comprises a parameter setting means for correcting at least one part of the spectral density value related to printing color for a particular color corresponding to the boundary between the hue areas and of the amount of toners used for printing said particular color, on the basis of a predetermined stoichiometric value and the received information by said input means, and for calculating the color correction parameters on the basis of said corrected spectral density value and/or amount of toners.

5. A device as claimed in claim 3, wherein said device further comprises an extraction means for extracting an achromatic color component contained in the input image signals on the basis of achromatic color extraction parameters which are changed in accordance with the hue area judged by said hue area judgement means.

6. A device according to claim 5, wherein said extraction means includes a plurality of multipliers, with each multiplier receiving one of said input image signals and each unit also receiving a coefficient signal from a coefficient circuit for producing a product signal, and at least one adder for adding together said product signals to produce an output signal.

7. A device according to claim 7, further comprising a removable circuit for subtracting from each of said input signals the output signal of said extraction means.

8. A device as claimed in claim 1, wherein said hue are judgement means comprises a hue signal production means for producing a hue signal from the input image signals, a hue hold means for holding predetermined signals of hue information, and a comparison means for comparing the hue signal from said hue signal production means and the predetermined signals from said hue hold means.

9. A color correction device for correcting input image signals of basic colors, representative of color-separated input images, to produce output image signals of other basic colors, representative of output images for printing, said device comprising:

a hue area judgement means for judging to which hue area among at least three predetermined hue areas the hue represented by said input image signals belongs;

a parameter setting means for setting color correction parameters in accordance with the hue area judged by said hue area judgement means; and a color conversion means for converting said input images signals to the output image signals by using said set color correction parameters, so that the input image signals are corrected in accordance with the hue area judged with respect to the same input image signals.

10. A device as claimed in claim 9, wherein said hue area judgement means includes a plurality of multipliers with each multiplier receiving one of said color correction parameters and one of said input signals for producing a product signal, and a plurality of adders corresponding in number to the number of said other basic colors for adding together the product signals related to the same corresponding color.

11. A device as claimed in claim 9, wherein said parameter setting means comprises a parameter hold means for holding color correction parameters the number of which is equal to or greater than the number of said predetermined hue areas, and a selection means for selecting a part of the color correction parameters held in said parameter hold means in accordance with the hue area judged by said hue area judgement means.

12. A device as claimed in claim 9, wherein said parameter setting means comprises a parameter setting means for correcting at least one part of the spectral density value related to printing color for a particular color corresponding to the boundary between the hue areas and of the amount of toners used for printing said particular color, on the basis of a predetermined stoichiometric value and the received information by said input means, and for calculating the color correction parameters on the basis of said corrected spectral density value and/or amount of toners.

13. A device as claimed in claim 9, wherein said device further comprises an extraction means for extracting image information on an achromatic color component from the input image signals by using achromatic color extraction parameters which are changed in accordance with the hue area judged by said hue area judgement means.

14. A device according to claim 13, wherein said extraction means includes a plurality of multipliers, with each multiplier receiving one of said input image signals and each unit also receiving a coefficient signal from a coefficient circuit for producing a product signal, and at least one adder for adding together said product signals to produce an output signal.

15. A device according to claim 14, further comprising a removable circuit for subtracting from each of said input signals the output signal of said extraction means.

16. A device as claimed in claim 9, wherein said hue area judgement means comprises a hue signal production means for producing a hue signal from the input image signals, a hue hold means for holding predetermined signals of hue information, and a comparison means for comparing the hue signal from said hue signal production means and the predetermined signals from said hue hold means.

17. A color correction device for correcting input image signals Dr, Dg, and Db of basic colors of red, green, and blue, representative of color-separated input images, to produce output image signals of other basic colors, representative of output images for printing, said device comprising:
a hue area adjustment means for judging to which hue area among at least three predetermined hue areas the hue represented by said input image signals belongs;
parameter hold means for holding color correction parameters xr, xg, and xb for the respective hue areas, each of said parameter hold means for the each hue area holding a plurality of the color correction parameters;
parameter selection means for selecting one set of color correction parameters xr, xg, and xb from color correction parameters in said parameter hold means in accordance with the hue area judged by said hue area judgement means; and
a color conversion means for converting said input image signals Dr, Dg, and Db, by using said selected color correction parameters xr, xg, and xb, to the output image signals which represent the result of calculation of $xr \cdot Dr + xg \cdot Dg + xb \cdot Db$, so that the input image signals are corrected in accordance with the hue area judged with respect to the same input image signals.

18. A device as claimed in claim 17, wherein said hue area judgment means includes a plurality of multipliers with each multiplier receiving one of said color correction parameters and one of said input signals for producing a product signal, and a plurality of adders corresponding to number to the number of said other basic colors for adding together the product signals related to the same corresponding color.

19. A color correction device for correcting input image signals of basic colors, representative of color-separated input images, to produce output image signals of other basic colors including an achromatic color, representative of output images for printing, said device comprising:
a hue area judgement means for judging to which hue area among at least three predetermined hue areas the hue represented by said input image signals belongs;
a first parameter setting means for setting achromatic color extraction parameters in accordance with the hue area judged by said hue area judgement means;
an extraction means for extracting an achromatic color component contained in said input image signals in accordance with said set achromatic color extraction parameters to produce an achromatic component signal representative of said extracted component;
an achromatic color correction means for correcting the input image signals in accordance with the achromatic component signal from said extraction means; and
a color conversion means for converting said corrected input image signals from said achromatic color correction means, to the output image signals by using color correction parameters.

20. A device as claimed in claim 19, wherein said hue area judgement means includes a plurality of multipliers with each multiplier receiving one of said color correction parameters and one of said input signals for producing a product signal, and a plurality of adders corresponding in number to the number of said other basic colors for adding together the product signals related to the same corresponding color.

21. A device according to claim 19, wherein said extraction means includes a plurality of multipliers, with each multiplier receiving one of said input image signals and each unit also receiving a coefficient signal from a coefficient circuit for producing a product signal, and at least one adder for adding together said product signals to produce an output signal.

22. A device according to claim 4, further comprising a removable circuit for subtracting from each of said input signals the output signal of said extraction means.

23. A device as claimed in claim 19, wherein said device further comprises a second parameter setting means for setting said color correction parameters in said color conversion means on the basis of the hue area judged by said hue area judgement means.

24. A device as claimed in claim 23, wherein said second parameter setting means comprises a parameter hold means for holding color correction parameters the number of which is equal to or greater than the number of said predetermined hue areas, and a selection means for selecting a part of the color correction parameters held in said parameter hold means in accordance with the hue area judged by said hue area judgement means.

25. A device as claimed in claim 23, wherein said second parameter setting means comprises a parameter setting means for correcting at least one part of the spectral density value related to printing color for a particular color corresponding to the boundary between the hue areas and of the amount of toners used for printing said particular color, on the basis of a predetermined stoichiometric value and the received information by said input means, and for calculating the color correction parameters on the basis of said corrected spectral density value and/or amount of toners.

26. A device as claimed in claim 19, wherein said first parameter setting means comprises a parameter hold means for holding achromatic color extraction parameters the number of which is equal to or greater than the number of said predetermined hue areas, and a selection means for selecting a part of the achromatic color extraction parameters held in said parameter hold means in accordance with the hue area judged by said hue area judgement means.

27. A device as claimed in claim 19, wherein said hue area judgement means comprises a hue signal production means for producing a hue signal from the input image signals, a hue hold means for holding predetermined signals of hue information, and a comparison means for comparing the hue signal from said hue signal production means and the predetermined signals from said hue hold means.

28. A color electrophotographic machine comprising:
a reading process means for optoelectrically converting light signals separated in basic colors, representative of color-separated images of an original document, to electrical input image signals, respectively;
a hue area adjustment means for judging to which hue area among at least three predetermined hue areas the hue represented by said input image signals belongs;
a parameter setting means for setting color correction parameters in accordance with the hue area judged by said hue area judgement means;
a color conversion means for converting said input image signals to output image signals by using said set color correction parameters, so that the input image signals are corrected in accordance with the hue area judged with respect to the same input image signals; and
an image printing means for printing a color image of the original in accordance with said converted output image signals.

29. A device as claimed in claim 28, wherein said hue area judgment means includes a plurality of multipliers with each multiplier receiving one of said color correction parameters and one of said input signals for producing a product signal, and a plurality of adders corresponding in number to the number of said other basic colors for adding together the product signals related to the same corresponding color.

30. A machine as claimed in claim 28, wherein said parameter setting means comprises a parameter hold means for holding color correction parameters the number of which is equal to or greater than the number of said predetermined hue areas, and a selection means for selecting a part of the color correction parameters held in said parameter hold means in accordance with the hue area judged by said hue area judgement means.

31. A machine as claimed in claim 28, wherein said parameter setting means comprises a parameter setting means for correcting at least one part of the spectral density value related to printing color for a particular color corresponding to the boundary, between the hue areas and of the amount of toners used for printing said particular color, on the basis of a predetermined stoichiometric value and the received information by said input means, and for calculating the color correction parameters on the basis of said corrected spectral density value and/or amount of toners.

32. A machine as claimed in claim 28, wherein said machine further comprises an extraction means for extracting image information on an achromatic color component from the input image signals by using achromatic color extraction parameters which are changed in accordance with the hue area judged by said hue area judgement means.

33. A device according to claim 28, wherein said extraction means includes a plurality of multipliers, with each multiplier receiving one of said input image signals and each unit also receiving a coefficient signal from a coefficient circuit for producing a product signal, and at least one adder for adding together said product signals to produce an output signal.

34. A device according to claim 33, further comprising a removable circuit for subtracting from each of said input signals the output signal of said extraction means.

35. A machine as claimed in claim 28, wherein said hue area judgement means comprises a hue signal production means for producing a hue signal from the input image signals, a hue hold means for holding predetermined signals of hue information, and a comparison means for comparing the hue signal from said hue signal production means and the predetermined signals from said hue hold means.

36. A color correction method for correcting input image signals of basic colors, representative of color-separated input images, to produce output image signals of other basic colors, representative of output images for printing, said method comprising the steps of:
judging to which hue area among at least three predetermined hue areas the hue represented by said input image signals belongs;
setting color correction parameters in accordance with the hue area judged; and
converting said input image signals to the output image signals by using said set color correction parameters, so that the input image signals are corrected in accordance with the hue area judged with respect to the same input image signals.

37. A method as claimed in claim 36, wherein said step of setting includes the step of holding color correction parameters the number which is equal to or greater than the number of predetermined hue areas and the step of selecting a part of the color correction parameters in accordance with the hue area judged.

38. A method as claimed in claim 36, wherein the step setting includes the step of correcting at least one part of the spectral density value related to the printing color for a particular color corresponding to the boundary between the hue areas and of the amount of toners used for printing said particular color, on the basis of a predetermined stoichiometric value and the received information, and calculating the color correction parameters on the basis of said corrected spectral density value and/or amount of toner.

39. A method as claimed in claim 36, further comprising the step of extracting image information on an achromatic color component from the input image signal by using achromatic color extraction parameters which are changed in accordance with the hue area judged.

40. A method as claimed in claim 36, wherein said step of judging includes the step of producing a hue signal from the input image signals, holding predetermined signals of hue information and comparing the produced signal and the predetermined signals.

41. A color correction method for correcting input image signals Dr, Dg, and Db of basic colors of red, green and blue, representative of color-separated input images, to produce output image signals of other basic colors, representative of output images for printing, said method comprising the steps of:
 judging to which hue area among at least three predetermined hue areas the hue represented by said input image signals belongs;
 holding color correction parameters xr, xg, and xb for the respective hue areas with a plurality of color correction parameters being held for each hue area;
 selecting one set of color correction parameters xr, xg, and xb from color correction parameters for each hue area judged; and
 converting said input image signals Dr, Dg, and Db, by using said selected color correction parameters xr, xg, and xb, to the output image signals which represent the result of calculation of xr·Dr+xg·Dg+xb·Db, so that the input image signals are corrected in accordance with the hue area judged with respect to the same input image signals.

42. A color correction method for correcting input image signals of basic colors, representative of color-separated input images, to produce output image signals of other basic colors including an achromatic color, representative of output images for printing, said method comprising the steps of:
 judging to which hue area among at least three predetermined hue areas the hue represented by said input image signals belongs;
 setting achromatic color extraction parameters in accordance with the hue area judged;
 extracting an achromatic color component contained in said input image signals in accordance with said set achromatic color extraction parameters to produce an achromatic component signal representative of said extracted component;
 correcting the input image signals in accordance with the achromatic component signal; and
 converting said corrected input image signals to the output image signals by using color correction parameters.

43. A method according to claim 42, further comprising the step of setting said color correction parameter in said converting step on the basis of the hue area judged.

44. A method according to claim 43, wherein said step of setting includes the step of holding color correction parameters, the number which is equal to or greater than the number of predetermined hue areas and the step of selecting a part of the color correction parameters in accordance with the hue area judged.

45. A method as claimed in claim 43, wherein the step of setting includes the step of correcting at least one part of the spectral density value related to the printing color for a particular color corresponding to the boundary between the hue areas and of the amount of toners used for printing said particular color, on the basis of a predetermined stoichiometric value and the received information, and calculating the color correction parameters on the basis of said corrected spectral density value and/or amount of toners.

46. A method as claimed in claim 42, wherein the first step of setting includes the step of holding achromatic color extraction parameters, the number of which is equal to or greater than the number of said predetermined hue areas and the step of selecting a part of the achromatic color extraction parameters held in accordance with the hue area judged.

47. A method as claimed in claim 42, wherein said step of judging includes the step of producing a hue signal from the input image signals, holding predetermined signals of hue information and comparing the produced signal and the predetermined signals.

* * * * *